US005797396A

United States Patent [19]
Geiser et al.

[11] Patent Number: 5,797,396
[45] Date of Patent: Aug. 25, 1998

[54] AUTOMATED METHOD FOR DIGITAL IMAGE QUANTITATION

[75] Inventors: Edward A. Geiser; David C. Wilson, both of Gainesville, Fla.

[73] Assignee: University of Florida Research Foundation, Gainesville, Fla.

[21] Appl. No.: 770,912

[22] Filed: Dec. 19, 1996

Related U.S. Application Data

[63] Continuation of Ser. No. 482,620, Jun. 7, 1995, abandoned.

[51] Int. Cl.$^6$ .................. A61B 5/00; A61B 8/00
[52] U.S. Cl. ............... 128/653.1; 128/654; 128/662.02; 382/128
[58] Field of Search ..................... 382/132, 128, 382/199, 266; 128/653.1, 654, 660.01, 660.07, 662.02, 695, 696

[56] References Cited

U.S. PATENT DOCUMENTS

| | | |
|---|---|---|
| 4,936,311 | 6/1990 | Oe .......................................... 128/695 |
| 5,257,624 | 11/1993 | Fraser et al. . |
| 5,360,006 | 11/1994 | Geiser et al. ...................... 128/653.1 |

FOREIGN PATENT DOCUMENTS 2 583 547    6/1985    France .

OTHER PUBLICATIONS

Geiser, M.D., et al. "Applications of Cross–Correlation Techniques to the Quantitation of Wall Motion in Short–Axis Two–Dimensional Echocardiographic Images", *Journal of the American Society of Echocardiography*, vol. 3, No. 4, pp. 266–275, Aug. 1990.

Edward A. Geiser, M.D., F.A.C.C., et al., "Clinical Validation of an Edge Detection Algorithm for Two–Dimensional Echocardiographic Short–Axis Images", *Journal of the American Society of Echocardiography*, vol. 1, No. 6, pp.410–421, Nov–Dec., 1988.

Edward A Geiser, M.D., et al., "A Second–generation Computer–based Edge Detection Algorithm for Short–axis, Two–dimensional Echocardiographic Images: Accuracy and Improvement in Interobserver Variability", *Journal of the American Society of Echocardiography*, vol. 3, No. 2, pp. 79–90, Mar./Apr., 1990.

David C Wilson, et al., "Automatic Center Point Determination in Two–Dimensional Short–Axis Echocardiographic Images", *Pattern Recognition*, vol. 25, No. 9, pp.893–900, 1992.

David C. Wilson, et al., "Feature Extraction in Two–Dimensional Short–Axis Echocardiographic Images", *Journal of Mathematical Imaging and Vision*, 285–298 (1983).

David C. Wilson, et al., "Mathematical Methods in Medical Imaging", *SPIE*, vol. 1768, Jul. 23–24, 1992.

(List continued on next page.)

*Primary Examiner*—Francis Jaworski
*Attorney, Agent, or Firm*—Arnold, White & Durkee

[57] ABSTRACT

A method for quantitatively analyzing digital images of approximately elliptical body organs, and in particular, echocardiographic images. In a first preferred embodiment, the invention automatically determines the center-point of an elliptical organ and a search region for border discrimination by finding the maximum value produced by a series of circular arc filters applied to the image data. In a second preferred embodiment, a pair of elliptical arc filters are used to make a first approximation of the positions of the right and left epicardium so that matched elliptical filters can be used to estimate the anterior epicardial position. The estimated position of the anterior epicardial, together with the posterior epicardial position, determines the center-point of the left ventricle. The positions of the organ borders are then approximated by generating amplitude distributions along each of a number of circular segments based on the center-point. The approximated borders are then compared on a best-fit basis to a set of paired elliptical arcs used to model the borders. The image may then be displayed with the modeled border superimposed on the image. A method of automated video densitometry is also disclosed whereby a sequence of end diastolic images are obtained before and after injection of a contrast agent.

38 Claims, 17 Drawing Sheets

OTHER PUBLICATIONS

Geiser, Edward A., "Applications of Automatic Edge Detection and Image Enhancement Techniques to Two–Dimensional Echocardiography and Coronary Disease," *Echocardiography in Coronary Artery Disease*, edited by Richard E. Kerber, M.D., Mount Kisco, New York:Futura Publishing Company, Inc., 1988.

Zhang, Liang–Fu and Geiser, Edward A., "An Effective Algorithm for Extracting Serial Endocardial Borders from 2–Dimensional Echocardiograms," *Transactions Biomed.Eng.*, BMIE–3 1:441–447, 1984.

Blokland et al., "Delineating Elliptical Objects with an Application to Cardiac Scintigrams", *IEEE Transactions On Medical Imaging*, MI–6(1):57–66, Mar. 1987.

Supplementary European Search Report, Mar. 14, 1994.

PCT International Search Report, Sep. 19, 1991.

Detmer, Paul R., et al., "Matched Filter Identification of Left–Ventricular Endocardial Borders in Transesophageal Echocardiograms", *IEEE Transactions on Medical Imaging*, vol. 9, No. 4, Dec., 1990.

McEachen II, John C., et al., "Shape–Based Tracking of Naturally Occurring Annuli in Image Sequences," *Computer Vision and Pattern Recognition '93*, New York, New York, 1993.

Parker, A.D., et al., "Application of Point Distribution Models to the Automated Analysis of Echocardiograms", *Computers in Cardiology*, pp.25–28, 1994.

PCT International Search Report, Oct. 4, 1996.

AUTOMATED METHOD FOR DIGITAL IMAGE QUANTITATION

This application is a continuation of application Ser. No. 08/482,620, filed Jun. 7, 1995 now abandoned.

This invention was made with government support under grant/contract number HL-35927 awarded by the National Institutes of Health. The government has certain rights in the invention.

BACKGROUND OF THE INVENTION

1. Field of the Invention

This invention relates to a method for quantitatively analyzing digital images of approximately elliptical body organs, and in particular, two-dimensional echocardiographic images.

2. Related Art

Two-dimensional ultrasonic imaging is used as an important non-invasive technique in the comprehensive characterization of a number of body organs. In ultrasonic imaging, a sound pulse is sent along a ray from a transducer towards the organ that is being imaged. The pulse is attenuated and reflected when it hits a medium with an acoustic impedance different from that of the medium in which the pulse is traveling. The time the sound pulse takes in transit is a measure of the distance of the boundary from the transducer, and the amount of energy that is reflected is a measure of the difference of the acoustic impedance across the boundary. (In practice, because the energy of the pulse diminishes as it travels, post-processing of the reflected signal includes time gain control that compensates the attenuation of the signal over time). Assuming the pulse travels at a single speed in the body, and by taking different rays across the plane, a two-dimensional record of the received energy in spatial coordinates represents a cross-sectional view of the imaged organ.

Echocardiography is the application of ultrasonic imaging to the heart. Echocardiography has experienced widespread acceptance in the evaluation of cardiac disease and in characterizing the structure and function of the heart. This acceptance is in large part due to its non-invasive nature, and its real-time capability for observing both cardiac structure and motion. Using echocardiography, a considerable amount of quantitative information can be obtained concerning cardiac anatomy, chamber diameter and volume, wall thickness, valvular structure, and ejection fraction.

The real-time capability of echocardiography can be used to measure the variation of the shape of heart structures throughout the cardiac cycle. These analyses require the complete determination of inner (endocardial) and outer (epicardial) boundaries of the heart wall, particularly of the left ventricle. Present evidence indicates that sensitive detection of ischemic disease with two-dimensional echocardiography requires knowledge of the endocardial border on echocardiographic frames throughout the cardiac cycle as well as at end- diastole and end-systole.

Because both global and regional left ventricular functions are major variables used to determine prognosis in cardiac disease, there is considerable interest in the ability to quantitate function indexes from echocardiographic images. Presently, such indexes (e.g., left ventricular chamber volume and left ventricular ejection fraction) are calculated from observer-defined cardiac boundaries traced with either a light pen or a digitizing tablet. Tracing of endocardial borders on two-dimensional echocardiograms is tedious and the selected borders are highly subjective. Indeed, in most systematic studies, substantial intra- observer and interobserver variability has been found in such observer-defined cardiac boundaries.

Manually defining such boundaries becomes increasingly labor intensive when the analysis of a complete cardiac cycle is needed to provide a description of the systolic and diastolic wall motion pattern, or when a number of echocardiographic frames have to be processed in order to obtain a long period time-history of cardiac function. It is therefore desirable to automate as much as possible the determination of boundaries of echocardiographic images. Automated definition of the boundaries would improve the reliability of the quantitative analysis by eliminating the subjectivity of manual tracing.

Automating the identification of boundary regions in echocardiograms using computers is often difficult because of the poor quality of the echocardiographic images. The lack of clear definition of the boundary regions is due to the intrinsic limitations of echo imaging, such as low image intensity contrast, signal dropouts in the image, and boundary discontinuity in any given frame. ("Dropouts" occur where sound waves are reflected from two different levels in a structure and the reflected waves arrive simultaneously at the face of the transducer but out of phase, causing a cancellation of their amplitudes. Thus, no return signal is perceived at that depth).

The poor quality of echocardiograms is also attributable to the reverberations of the initial sound pulse, and "speckle" noise, caused by the back scattering of the incident wave front after it hits tissue microstructures (this phenomenon produces a very fine texture, a "salt and pepper" pattern, that is superimposed on the image). Another limitation of echocardiographic imaging is that sound reflection is not very pronounced when the angle between a boundary of the heart and the ray along which the sound pulse is traveling is small. Hence, the lateral wall boundaries of the heart are usually not very well defined in echocardiographic images. Thus, in imaging the left ventricle, typically only the anterior and posterior cardiac walls are well-defined.

In the past several years, advances in computer data processing technology have allowed the application of several different automatic boundary detection methods to echocardiographic images. However, most researchers have had difficulties with image enhancement and boundary detection with echocardiographic images because of the low signal-to-noise ratio and large discontinuities in such images. Thus, automated border detection has been reported in two-dimensional echocardiographic images, but only when the images are of good quality and certain smoothing techniques are employed prior to edge detection in order to render the endocardial edge more continuous. An overview of the field is set forth in Chapter 22 of *Echocardiography in Coronary Artery Disease*, Kerber, Richard E., Ed., entitled *Applications of Automatic Edge Detection and Image Enhancement Techniques to Two-Dimensional Echocardiography and Coronary Disease*, by E. A. Geiser (Futura Publishing Company, Mount Kisco, N.Y. 1988 ISBN 087993-325-9).

Consequently, there is a need for a method for automatically determining quantitative characteristics of ultrasonic images, especially echocardiographic images. In particular, there is also a need for a method that can automatically determine the center of an imaged structure and approximate the borders of such a structure. With respect to echocardiographic images, there is a need for an automated system that can determine the center of the left ventricle, approximate both the endocardial and epicardial borders, and estimate cardiac wall motion without the necessity of any user input. In addition, it is also desirable to automatically detect the presence of a flattened interventricular septum caused by pressure or volume overload from the right ventricle.

The present invention provides such a method. The invention uses mathematical techniques implemented in computer software which allows near real-time automatic quantitation of cardiac wall motion, cardiac wall thickness, and the area change fraction of two-dimensional short-axis echocardiographic image studies. Some applications of this system would be in a hospital at a patient's bedside, or in an echocardiography suite, where a detailed evaluation of a patients cardiac health is required. Another application would be in an operating room, where elderly patients with significant coronary arterial disease are to undergo surgery. The invention provides a means for continuously and automatically monitoring a patient's heart for possible ischemic changes during surgery. Thus, an attending physician could be warned of a potential danger without requiring continuous physician monitoring of a patient, or invasive catheter placement.

SUMMARY OF THE INVENTION

The inventive method in one preferred embodiment uses circular arc filters of very large size to automatically identify the center-point of the left ventricle and the area enclosed by the epicardial border. The circular arc filters used to determine the approximate epicardial border region along the posterior wall of the left ventricle can be thought of as an approximation of the sum of all nearby directional derivatives taken in the direction of the center-point. In one illustrated embodiment, the inventive method then uses a pair of circular arc filters to simultaneously identify the endocardial and epicardial border regions along the anterior ventricle wall.

In another preferred embodiment, the inventive method uses a pair of elliptical arc filters to make a first approximation of the positions of the right and left epicardium so that elliptical filters can then be used to estimate the position of the epicardial border regions along the anterior ventricle wall. The estimated position of the anterior epicardial border, together with the posterior epicardial position, determines the center-point of the left ventricle.

After the automatic determination of the center-point, in one embodiment, generation and analysis of circular sector first derivative amplitude distributions determines the most probable locations of the epicardial and endocardial borders. A set of six elliptical arcs are then chosen to model the endocardial and epicardial borders as the union of the six elliptical arcs spliced together. Four of the six arcs are used to model the entire epicardial border, while the other two arcs model the endocardial border along the anterior wall of the ventricle. The gap between the best-fit pair of such curves provides a measure of wall thickness along the anterior wall. The use of paired arcs helps prevent identification of the endocardial border as the epicardial border, or vice versa.

A number of one-dimensional first derivative amplitude distributions are then formed for each of a corresponding number of sectors emanating from the determined center-point. Cross-correlation of the amplitude distribution between the echocardiographic frame at end-diastole and the echocardiographic frame at end-systole is used to detect cardiac wall motion in each of the different sectors. The cross-correlation technique provides a dynamic matched filter requiring only an imperfect estimate of the endocardial border. The inventive method thus provides quantitation of regional wall motion in real-time or near real-time without performing actual border detection. This process maximizes the image information used in quantitation.

In another preferred embodiment, after the automatic determination of the center-point, elliptical filters are used to make a second approximation of the positions of the left and right epicardial borders. In performing the second approximation, the elliptical filters are dynamically determined based upon the radii to the anterior and posterior epicardial walls, the semi-major axis, and the distances from the calculated center-point to the right and left epicardial borders. Once the center-point and epicardial borders are approximated, the left ventricle cavity is sub-divided into several equiangular regions. The cumulative distributions of the average gray level at any radial distance from the calculated center-point are computed for each region. The cumulative distributions are used for adjusting the approximation of the position of the epicardial border and for defining the endocardial border.

Figures of merit for the epicardial and endocardial borders are then calculated as part of the process of defining the epicardial and endocardial position estimates. A region for calculating the average cavity or chamber gray level is defined within the ventricular chamber. The intensity values of pixels along the elliptical arcs defining the epicardium are compared to the chamber gray levels within the region. The epicardial and endocardial position estimates are evaluated based upon the result of the comparison.

The invention also includes a means for determining the presence of a flattened septum caused by pressure or volume overload from the right ventricle. A paired set of straight line filters are applied to the echocardiographic image in a manner similar to the paired circular filters used to detect the anterior epicardial and endocardial borders. The invention also includes a test to detect the lack of signal ("dropout") across the septum of the left ventricle. This test consists of a comparison of the minimum average grey level of a small image region in the cavity of the heart with the maximum average grey level of a similarly sized region chosen along a line from the center of the ventricle in the direction of the septum. If the ratio of grey levels in the maximum area to the minimum area is less than two, signal dropout is considered to have been detected. The invention further includes a method of performing blood pool classification on a pixel-by-pixel basis, starting from an automated determination of the center of the ventricle.

In addition, an inventive method of automated video densitometry is disclosed whereby a sequence of end diastolic images are obtained before and after injection of a contrast agent. In each sequence, control frames are obtained from the baseline period before a contrast agent is injected. After stripping away patient data, ECG, and other irrelevant information, the sides and last row of the sector scan are identified. The inventive method next detects the approximate position of the endocardial and epicardial borders. The endocardial borders defined during the control period are used as the region of interest for the left ventricular chamber. The method also establishes a region of interest for the right ventricular outflow tract. Following injection of the contrast agent, the position of the posterior epicardium on each frame is approximated by computing a posterior circular arc filter. To ensure that the left and right ventricular regions of interest are properly registered on all frames throughout the respiratory cycle, the regions of interest are translated based upon the difference in position of the posterior circular arc filter as compared to its position in the first control frame. The mean pixel intensity of the left ventricular chamber is calculated for the pixels enclosed by the approximated endocardial border. Similarly, the mean pixel intensity of the right ventricular outflow tract is also calculated. The mean pixel intensity for the sequence of end diastolic frames is compared with a background pixel intensity mean resulting in a time-mean brightness curve for each injection. Regions of the myocardium are segmented into regions approximating distributions of coronary arteries. The inventive method is used to estimate whether perfusion is present in a region by comparing pre-contrast mean pixel brightness to that calculated after injection of the contrast agents.

The details of the preferred embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE PREFERRED EMBODIMENTS

Throughout this description, the preferred embodiment and examples shown should be considered as exemplars, rather than limitations on the method of the present invention.

Overview

The following discussion assumes a 512×480 pixel image. However, as one skilled in the art will appreciate the following discussion may be readily applied to an image of any resolution.

Figure 1:
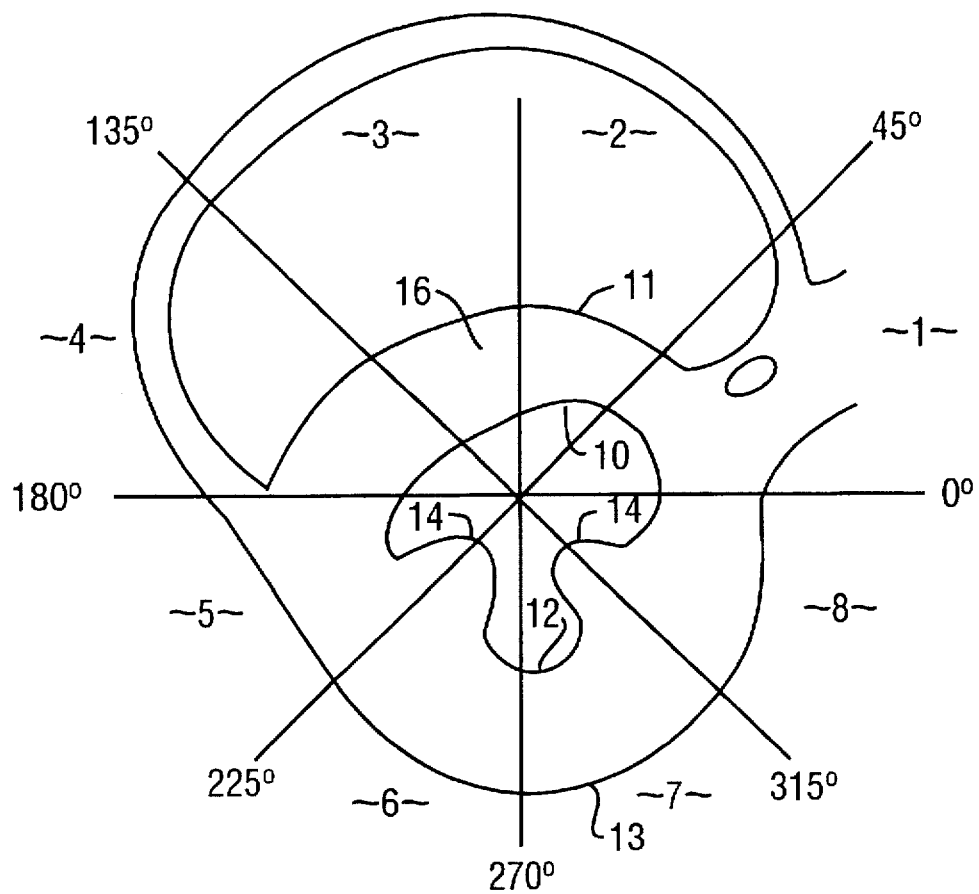
FIG. 1 discloses a diagram of the left ventricle and part of the right ventricle of a heart imaged along the short axis of the heart.

FIG. 1 discloses a diagram of the left ventricle and part of the right ventricle of a heart viewed along the short axis of the heart. Indicated for the left ventricle are the anterior endocardial border 10, the anterior epicardial border 11, the posterior endocardial border 12, and the posterior epicardial border 13. The regions of tissue protruding into the left ventricle near the posterior endocardial border 12 are the papillary muscles 14. The cross-section of the left ventricle is approximately elliptical in cross-section for both the endocardial border and the epicardial border.

Shown superimposed on the diagram of the left and right ventricles is a set of lines that are commonly used to arbitrarily divide the left ventricular region into eight 45° sectors. The sectors are commonly numbered in order from 1 through 8, beginning with the sector encompassing the anterior left ventricle free wall 1 and proceeding counter-clockwise to the anterolateral left ventricular free wall 8. Sectors 2, 3, and 4 encompass the interventricular septum 16, which separates the left ventricle from the right ventricle.

In the preferred embodiment, the inventive method is implemented by means of a computer program on a computer. Echocardiographic images are obtained from an ultrasound system that acquires frames at a rate of approximately 30 frames per second. Such ultrasound systems are well known in the art. The frames are digitized and stored on any convenient storage medium (such as a magnetic or optical disk drive). In the preferred embodiment, digitization of the frames is carried out using a 512×480 pixel matrix. Sampling and digitizing such image data is well known in the art, and is commonly carried out by "frame grabber" circuitry. Preferably, video frames for the entire cardiac cycle to be studied are digitized.

The first step in the automated process of the present invention is to determine the center-point of the left ventricle and a search region for border discrimination. A center-point is estimated in one embodiment by using circular arc filters to determine the approximate positions of the epicardial and endocardial borders. In another preferred embodiment, the center-point is estimated by first determining the position of the posterior epicardium using a circular arc filter, and then making an approximation of the positions of the right and left epicardium using elliptical arc filters. Once the center-point and search regions are estimated, the probable positions of the epicardial and endocardial borders are more closely approximated. In a first embodiment of the inventive method, the probable positions of the epicardial and endocardial borders are approximated by generating amplitude distributions along each of a number of circular segments based on the computed center-point. In a second preferred embodiment of the present inventive method, the probable positions of the epicardial and endocardial borders are approximated by using matched elliptical filters which are dynamically determined by the radius to the anterior and posterior walls, the semi-major axis, and the distance from the center-point to the right and left borders. Then both the epicardial and endocardial borders are then approximated by closed contours each forms as the union of four elliptical arcs. The echocardiographic image may then be displayed with the modeled border superimposed upon the image.

Figures of merit are calculated during the process of defining the epicardial and endocardial position estimates. The figures of merit may be used for image enhancement purposes. Image enhancement can be performed manually by a technician, or automatically wherein the figures of merit can be provided as feedback data to the ultrasound system.

The following terms and variables are defined as such throughout this application:

m=# of rows in the sector scan n=# of columns in the sector scan

Key variables associated with posterior filter:

reach_p=reach associated with posterior filter inner_radius_p=inner radius associated with posterior filter outer_radius_p=outer radius associated with posterior filter band2_p=width of band associated with 2nd rectangle of computation in posterior filter band3_p=width of band associated with 3rd rectangle of computation in posterior filter Key variables associated with anterior filter:

reach_a=reach associated with anterior filter inner_radius_a=inner radius associated with anterior filter outer_radius_a=outer radius associated with anterior filter reach_b_a=reach associated with band in anterior filter min_wall=minimum wall thickness Definitions:

reach_p=m/50 outer_radius_p=m/4 inner_radius_p=outer_radius_p−7*reach_p band2_p=m/6+1
band2_p=m/24+1
reach_a=m/60
outer_radius_a=m/5
inner_radius_a=outer_radius_a−7*reach_a
reach_b_a=m/25
min_wall=2*reach_p Determination of the Posterior Border Using Circular Arc Filters In this section, the descriptions apply to m×n images. The most prominent features in a two-dimensional echocardiographic image are the high intensity values representing the pericardium behind the posterior wall. Therefore, the posterior epicardial border 13 is normally reasonably well-defined. However, the presence of the papillary muscles 14 and other internal structures in the lower interior of the heart obscure the bounds of the posterior endocardial border 12.

Figure 2:
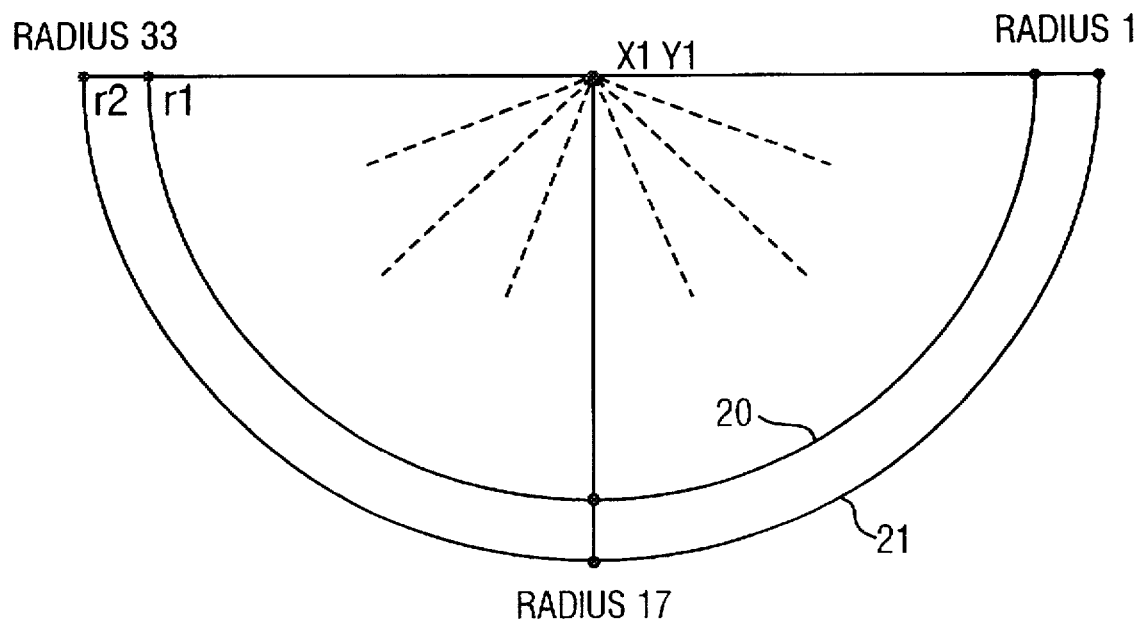
FIG. 2 is a diagrammatic representation of the posterior circular arc filter used in the illustrated embodiment of the present invention.

Consequently, in a first preferred embodiment, a single "circular arc" filter is used to compute a region of interest for the posterior epicardial border 13 of the heart. The process basically comprises computing for each pixel $(x_i, y_j)$ maximum of a set of numbers $s_2-s_1, s_3-s_2, \ldots s_8-s_7$, where each $s_k$ represents the sum of pixel values on 33 radii uniformly distributed along a set of semicircular arcs of radius inner_radius_p, inner_radius_p+reach_p, ..., outer_radius_p pixel lengths, respectively, in the illustrated embodiment. The angles associated with the pixel locations along the semicircular arc range from 180° to 360°, with each sector encompassing about 5.6° in the illustrated embodiment. The circular arc filter used to determine the approximate posterior epicardial border 13 region can be thought of as an approximation of the sum of all nearby directional derivatives taken in the direction of the center-point. FIG. 2 shows a diagrammatic representation of the posterior circular arc filter used in the illustrated embodiment of the present invention. Shown diagrammatically are an inner arc 20 and an outer arc 21 of pixel locations at two selected distances from $(x_i, y_j)$.

Thus, for the 33 radii, the intensity values of the pixels on the radii a pre-set distance from $(x_i, y_j)$ are summed and then subtracted from a similar sum for the next pre-set distance. For example, if each radius is started at inner_radius_p pixel lengths from $(x_i, y_j)$, and increased by reach_p pixels for each arc computation, then the pixel intensities on each radius at inner_radius_p pixel lengths from $(x_i, y_j)$ are summed to form $s_1$, then all of the pixel intensities on each radius at inner_radius_p+reach_p pixel lengths are summed to form $s_2$, etc.

An advantage of the present invention is that it uses the maximum value from seven filters (in the illustrated embodiment) each having 66 non-zero weights. Most edge-detection techniques use such standard operators as the 3×3 Sobel, Laplace, Prewitt, or Kirsh operators. Thus, the maximum number of non-zero weights in these standard operators is nine. Even edge-detectors having a size larger than 3×3 are frequently simply larger versions of these standard operators. The large filter size of the present inventive method maximizes the use of the image information used in quantitation.

Application of this circular arc filter has the effect of superimposing a series of seven semicircular regions having a "thickness" of reach_p pixel lengths and centered on each pixel of the echocardiographic image. Identifying the semicircular region that "covers" the largest number of high-intensity pixels determines one pixel that is designate $(x_0, y_0)$, a first tentative center-point for the left ventricle, and a radius which approximates the distance to the posterior epicardial border 13.

In an alternative embodiment of the invention, the above operation is refined to reduce computational requirements of computing the filter values. The best-fit filter is computed in three passes rather than in one pass. In the first pass, the operator is evaluated at every third x and y location in the image, and the actual operator computed is the maximum of the sums: $(s_k-s_{k-c})+(s_k-s_{k-2c})$, where each $s_k$ term is computed as described above, and c is a constant set to be 1 unit of increment in the preferred embodiment (in the preferred embodiment, c=min_wall/2 pixels, which is approximately ½ of the minimum wall thickness—about min_wall pixels expected to appear in any images). In addition, the location in the image midway along each "outer" circular arc (i.e., the pixel location closest to the bottom of the image, as shown in FIG. 2) is constrained to have a pixel value greater than ½ the highest expected value in the image. This added condition ensures that only locations of high intensity will be considered as possible epicardial border locations.

The extra term $(s_k-s_{k-2c})$ is added to allow for the fact that the epicardium may not be perfectly circular. However, this added factor also tends to emphasize the high pixel values of the "speckle" noise usually present adjacent to the posterior pericardium.

This first pass will not always provide an optimal center approximation $(x_0, y_0)$, but experience has shown that the approximated center does lie within the ventricular chamber.

In the second pass, the filter is computed at every other x and y in a band band2_p pixels wide centered about the $y_0$ column identified as a best-fit in the first pass (i.e., band2_p/2 pixels on either side of the first approximated center, $(x_0, y_0)$). Once again, the operator computed is the maximum of the sums: $(s_k-s_{k-c})+(s_k-s_{k-2c})$. Evaluation of this operator again returns a best-fit center-point, $(x_0, y_0)$. In the third pass, the filter is computed at every x and y in a band band3_p pixels wide centered about the $y_0$ column identified as a best-fit in the second pass (i.e., band3_p/2 pixels on either side of the second approximated center, $(x_0, y_0)$). In this pass, the extra term is not used, and the operator computed is the maximum of the sums: $(s_k-s_{k-c})$. Evaluation of this operator again returns a best-fit center-point, $(x_0, y_0)$. Dropping the extra term $(s_k-s_{k-2c})$ allows for improved precision in the estimate of the epicardial border.

This three pass technique reduces the computation time for generating the best fit approximation of $(x_0, y_0)$ to one-third of the time required for the first embodiment when implementations of both embodiments are run on a particular computer.

Other values may be selected for the radial increments and the number of radii used in determining the semicircular arc that defines the first tentative ventricular center-point and posterior search region. Further, rather than computing the set of circular arc filter values for every pixel in the echocardiographic image, a subset of pixels may be preselected. For example, pixels near the edge of the image may be skipped because the center of the left ventricle can be assumed to be in a central region of the image rather than near an edge. As another example, pixels that are within 30 pixels of the bottom of the image may be omitted, since the circular arcs in the illustrated embodiment have a minimum radius of 30 pixel lengths. Moreover, the circular arc filters need not be computed for every pixel, but only for pixels spaced a desired distance apart, in order to decrease the number of potential center-point sites and reduce computational requirements. Other simplifying assumptions may be made based on similar considerations.

Determination of the Posterior Border Using an Alternative Circular Arc Filter Procedure In an alternative embodiment, the posterior circular arc filter is computed in a lower half of the digital image only at points which are greater than 60% of the maximum intensity level of the pixels found in the image. Similar to the posterior filter calculation described above, the alternative posterior filter is also calculated in three passes. Each time the posterior filter is calculated, the radius of the circular arc is determined based upon the "zone" occupied by the calculation point (see, for example, zones 1, 2, and 3 in FIGS. 3a and 3b). The farther the zone is from the transducer, the larger the radius of the circular arc filter. The first pass determines the column that is most consistent across multiple frames ("best col"). The second pass, which searches in a small band around the calculated best column, determines the most consistent row ("best row") across multiple frames. Finally, the maximum value of the circular arc filter on each frame is determined within a small region around the best column and best row.

The rationale behind using a posterior circular arc filter is based upon the physical anatomy of the left ventricle, the instrumentation of the ultrasound device, and the geometry of the reflectance of signals generated by the ultrasound device. Short-axis views of the left ventricle produce oval-shaped cross-sectional regions. Circular arcs provide a reasonable approximation over fairly broad portions of the epicardial boundary.

One of the fundamental principles underlying the present imaging system is the observation that each time an ultrasound wave approaches a boundary between two tissues, a portion of the wave is reflected at the interface of the two tissues and the remainder is propagated on into the second tissue. In order for the interface to act as a specular reflector, it is necessary that the interface be greater in size than the wavelength of the incident sound. It is also important that the surface be smooth. When these two conditions are met, the intensity (I) of the reflected wave is given by:

$$I_r = I_i \left( \frac{Z_2 - Z_1}{Z_2 + Z_1} \right)^2$$

where r denotes the reflected wave, i denotes the incident wave, and $z_k$ where k equals 1 or 2, denotes the characteristic impedance of the respective tissues. Because the characteristic impedances of myocardium and lung are quite different (about 1.7 and 0.26 rayles, respectively), the circularly-shaped interface between the posterior lung and myocardium/pericardium interface reflects a very high proportion of the incident energy. Thus, this interface, which is virtually orthogonal to the ultrasound signal, is consistently the most prominent feature in the image. The most prominent features in the image are the high intensity values representing the pericardium behind the posterior wall. An additional characteristic of the images under consideration is that the speckle noise behind the posterior wall is also a prominent and frequently occurring feature in the images. Instead of attempting to eliminate this unwanted feature by enhancing the image using an edge detector, the posterior filter is designed to include the speckle noise in a search for the epicardial boundary.

The first step in computing the posterior circular arc filter is to identify the maximum pixel value in the portion of the image where the interface of myocardium and lung is expected. For the frame at end systolic (ES), this region will encompass those pixels in the lower half of the image away from the lateral boundaries. For the frame at end diastolic (ED), this region is a small rectangle centered at the location found in the ES frame having a size large enough to account for possible translational and contracting motion of the heart motion. Two threshold values which are fractions of this maximum pixel value are selected. In the preferred embodiment, the two threshold values $t_1$ and $t_2$ are set equal to ½ and ¾, respectively. A new temporary image is created having pixel values equal to one of the integers 0, 1, or 2, depending upon whether or not the image value at that location is less than $t_1$, between $t_1$ and $t_2$, or above $t_2$. If the original pixel value is below $t_1$, the new pixel value associated with that pixel is set equal to 0. If the original pixel value falls between $t_1$ and $t_2$, the new pixel value for that pixel is set equal to 1. Finally, if the original pixel value is greater than $t_2$, the new pixel value is set equal to 2. Any pixel location in this region with value above $t_1$ is considered a possible representative for the epicardial boundary along the posterior wall.

The next step in computing the posterior circular arc filter is to determine an expected vertical diameter of the patient's myocardium. The expected diameter of the patient's myocardium is dependent upon a number of factors. For example, the expected vertical diameter depends upon the number of rows of scan conversion used to transform the input polar scan data to Cartesian coordinates, the size of the typical patient's heart, and the depth setting selected by the technician. The expected radius is set to ½ the value of the expected vertical diameter of the patient's myocardium. Using radii which vary from ½ to 1½ of this expected radius value, the gray level values of 100 equally spaced pixel locations along a 180° circular arc are summed. The values are preferably summed in steps of reach_p pixels.

Figure 4:
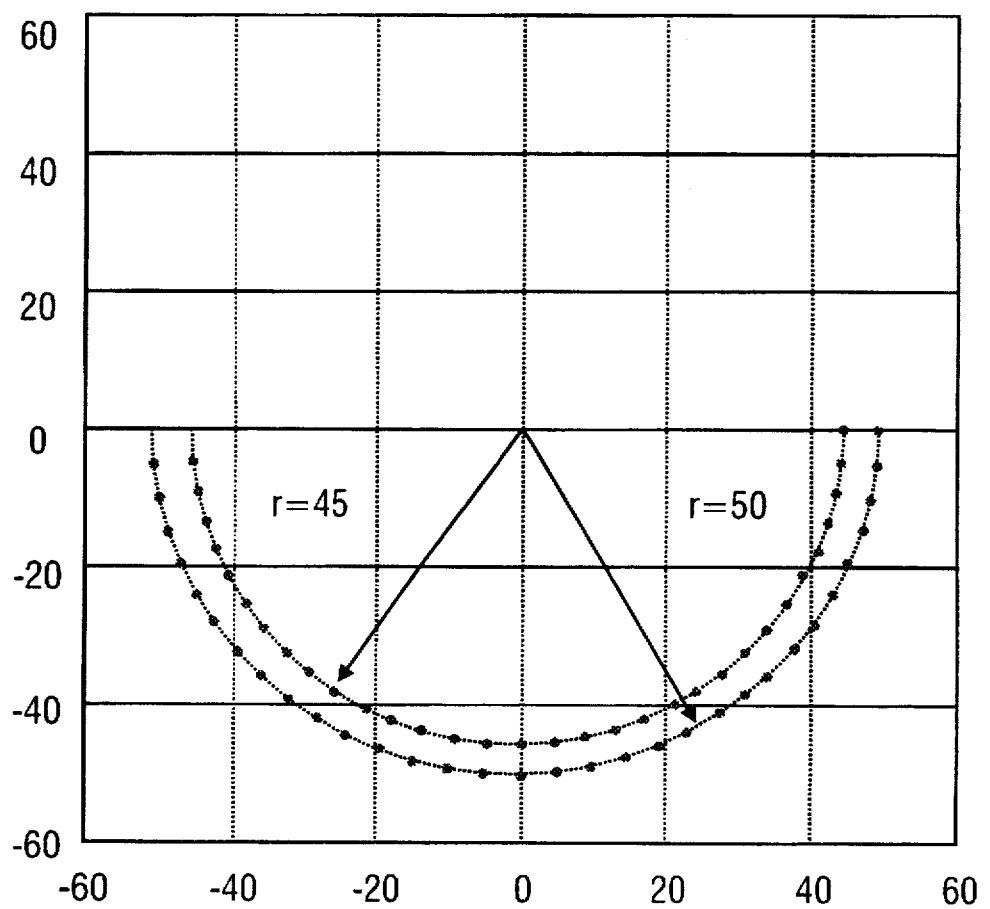
FIG. 4 is a diagrammatic representation showing pixel locations calculated using the posterior arc filter of the present invention.

A diagram of these pixel locations for a radius equal to 50 is indicated in FIG. 4. The semicircle of radius equal to 45 is included in FIG. 4 to indicate the pixel locations where the gray values are subtracted. If r is any such radial length, then sum(r) denotes the sum of the pixel values along the circular arc. Let $sum_2(r)$ denote the sum of the pixel values along a 90° subarc (symmetric with respect to the y-axis). For each such arc, the same number of pixel values are to be summed along each arc. If a pixel value is greater than threshold $t_1$, then the output value of the filter at that location is defined to be:

totalsum=sum(r)+2sum(r+step)−sum(r−step)−sum (r−2step) −(r−3step)−sum₂(r−step).

After calculating this sum, a variable totalsum is multiplied by min(r, expectedradius). This filter is a convolution of the temporary array by the invariant template having weights +1 at most of the indicated locations. The exception is along the arc of radius r+step, where the weight is equal to 2. The reason for this weight of 2 is that although the speckle noise behind the posterior wall is of no interest, it tends to be an excellent indicator of the location of the epicardial boundary along the posterior wall. If the term $sum_2$(r−step) is not subtracted, the estimate of the epicardial boundary is often too low. The factor min(r, expectedradius) prevents the radial estimate from being to small. The output returned by the posterior circular arc filter includes a best center $(x_0, y_0)$, a best estimate of the epicardial boundary location $(x_0, y_{rowepidown})$, and a best radius $r_0$.

Figure 5:
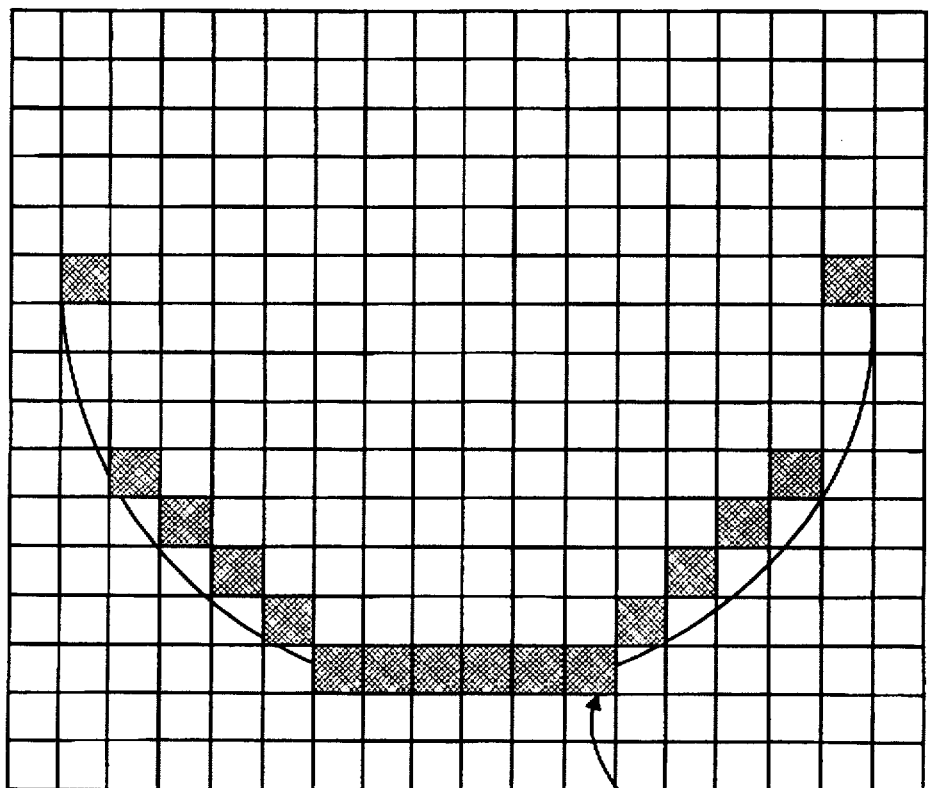
FIG. 5 is a diagrammatic representation showing how the posterior circular arc filter is preferably computed having only one point per column in the image, resulting in a natural concentration of points near the posterior epicardial position of interest.

As shown in FIG. 5, the posterior circular arc filter is preferably computed having only one point per column in the image. Thus, a natural concentration (weighting) of points near the posterior epicardial position 50 of interest results. The filter, however, remains circular, i.e., $x^2+y^2=r^2$.

Figure 3A:
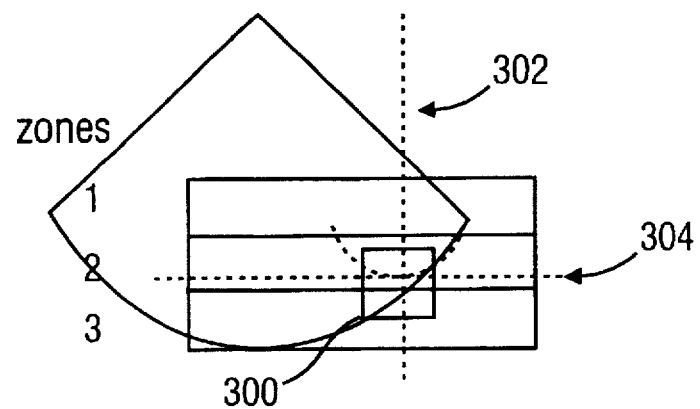
FIGS. 3a and 3b are diagrammatic representations showing how the search for the endocardial and epicardial border regions is restricted to improve related computation speeds in accordance with the present invention 300 search area; 302 best column; 304 best row; 305 first approximation center point; and, 306 posterior epicardium.
Figure 3B:
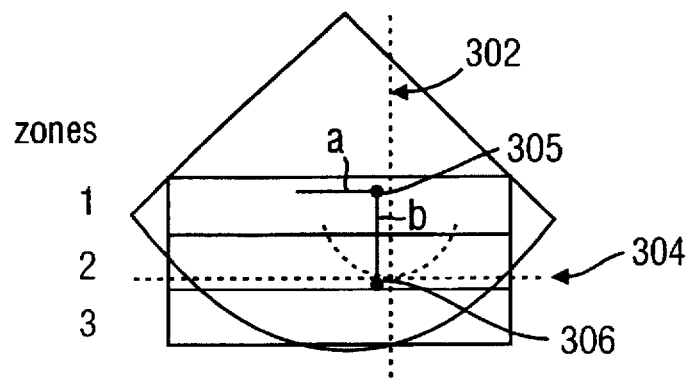

As stated above, the posterior circular arc filter is preferably computed in the lower half of the image only at points which are greater than 60% of the maximum intensity of the image. The filter is preferably computed at three radii on each frame. The frame which produces the most consistent result is treated as the best frame and further calculations are computed from this frame. FIGS. 3a and 3b show how the search for the endocardial and epicardial border regions is restricted in order to improve computation speeds. For example, as shown in FIG. 3a, after the first two passes in the calculation of the posterior filter, a small region 300 around the best column 302 and the best row 304 produced during the first and second passes, respectively, is used to restrict the final calculation of the posterior epicardial position across multiple frames. The maximum value of the circular arc filter computed for each frame within the small region 300 determines the approximate position of the posterior epicardium.

Determination of Anterior Border

Referring again to FIG. 1, after the posterior search region is computed, the anterior endocardial 10 and epicardial borders, 11 are, in a first preferred embodiment of the present invention, approximated simultaneously by a procedure basically similar to the posterior circular arc filtering method. A set of pixels near $(x_0, y_0)$ are selected as starting points for generating circular arc filters. In one preferred embodiment, the starting pixels have an x value within reach_b_a pixel lengths of $x_0$ (i.e., $|x-x_0|<10$), and a y value less than 2*reach_b_a pixel lengths greater than $y_0$ (i.e., $y<y_0+2*$reach_b_a). This limits the number of pixels for which circular arc pairs must be computed.

For the anterior region, because the endocardial border 10 is generally more clearly defined than in the posterior region, a pair of coupled circular arc filters are concurrently computed. The inner circular arc filter approximates the location of the anterior endocardial border 10, while the outer circular arc filter approximates the location of the anterior epicardial border 11. By using coupled circular arc filters, the possibility that the epicardial border 11 will be identified as the endocardial border 10, and vice versa, is reduced.

Figure 6:
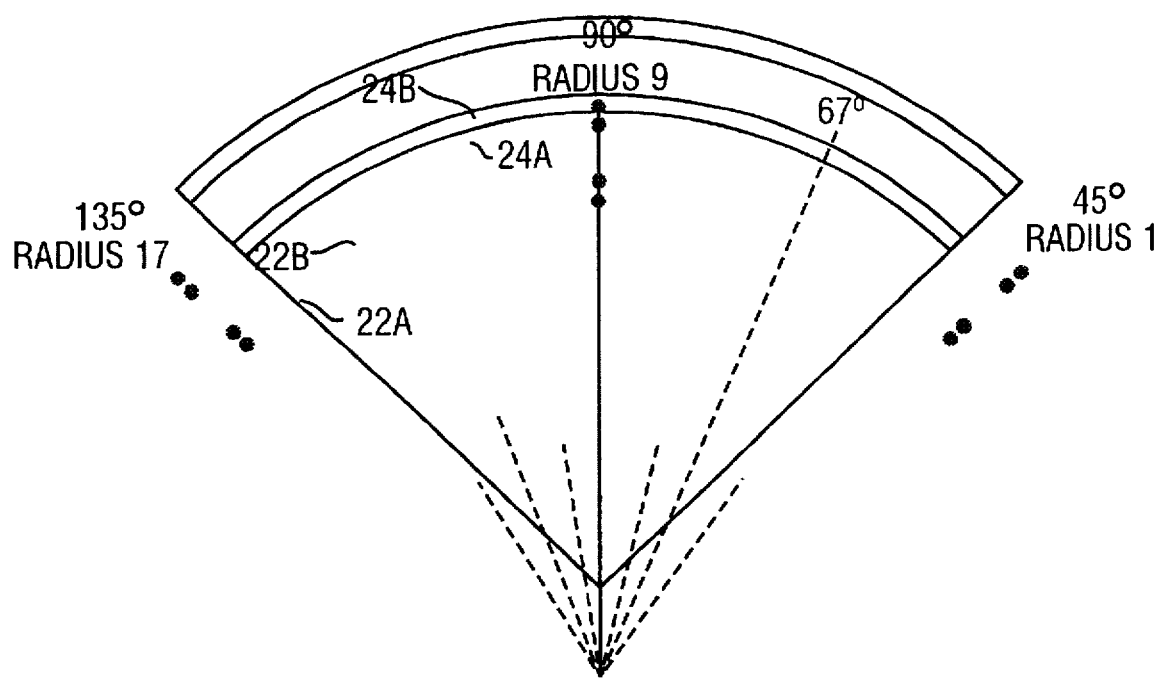
FIG. 6 is a diagrammatic representation of the anterior paired circular arc filters used in one preferred embodiment of the present invention.

FIG. 6 is a diagrammatic representation of the anterior circular arc filter pairs used in the illustrated embodiment of the present invention. Shown is an inner pair of arcs 22a, 22b and an outer pair of arcs 24a, 24b of pixel locations. The inner arcs 22a, 22b form the endocardial circular arc filter, while the outer arcs 24a, 24b form the epicardial circular arc filter. The number of pixel units between each of these pairs of arcs is chosen to be reach_a in the preferred embodiment.

For the anterior endocardial border 10, the process basically comprises computing for each pixel $(x_i, y_j)$ the maximum of a set of numbers $s_2-s_1, s_3-s_2, \ldots s_8-s_7$, where each $s_k$ represents the sum of pixel values on 17 radii uniformly distributed along a set of 90° arcs of radius inner_radius_a, inner_radius_a=reach_a, . . . , outer_radius_a pixel lengths, respectively, in the illustrated embodiment. The angles associated with the pixel locations along the 90° arc range from 45° to 135°.

For the anterior epicardial border 11, the process is slightly altered to create an asymmetric filter. The physical reason for the asymmetry on the right hand side of the epicardial portion of the filter is the fact that two-dimensional transthoracic echocardiographic images frequently exhibit a shift from low intensity of returned signal between the heart and transducer to high intensity in the portion representing lung. Therefore, the circular arc filter for the anterior epicardial border 11 is weighted by radial angle. For each pixel $(x_i, y_j)$, the maximum is determined for a set of numbers max $(s_k-s_{k+1}, 2 \cdot s_k-s_{k-1}-s_{k+1})+t_k-t_{k+1}$, where each $s_k$ is the sum of pixel values uniformly distributed on five radii from 45° to 67°, and $t_k$ is the sum of pixel values uniformly distributed on twelve radii from 67° to 135°. In the illustrated embodiment, the circular-section arcs have a radius in the range of inner_radius_a, inner_radius_a+reach_a, . . . , outer_radius_a pixel lengths.

To avoid double counting of pixel intensities in the anterior region, in the illustrated embodiment the radii associated with the epicardial filter are constrained to be at least 7*min_wall/10 pixel lengths larger than the radii associated with the endocardial filter.

The resulting pixel location that gives a maximum for the paired circular arc filters is designated $(x_1, y_1)$, which is a second tentative center-point for the left ventricle. The two radii associated with the paired filters provide estimates to the endocardial and epicardial borders 10, 11 along the anterior wall. The difference between the two radii provides an estimate of the ventricular wall thickness.

Determination of the Center-Point

Testing of the inventive method using circular arc filters on a variety of echocardiographic images indicates that the calculated tentative center-points $(x_0, y_0)$, and $(x_1, y_1)$ tend to be somewhat high. Experimentation has shown that the true center-point is closer to one-half of the distance between the anterior and posterior epicardial borders 11, 13 along the vertical axis defined by $x_0$. The center-point is thus determined to be located at $(x_0, y_2)$, where $y_2=(y_0+r_0+y_1-r_1)/2$ and the values $r_0$ and $r_1$ are the distances from the respective tentative centers to the corresponding epicardial border.

In an alternative embodiment the method for detecting the anterior epicardial and endocardial borders is varied to include a weighting function that provides a measure of the probability that a point y is in fact a border point. The technique determines the probable locations of specular targets in the region of the anterior wall. The purpose of the procedure is to reduce the possibility that a non-structure location in the image will be identified as epicardium.

The alternative procedure selects a narrow band (preferably 2*min_wall+1 pixels) about the $y_0$ value determined in the steps above. A one-dimensional distribution D(y) is formed by summing the pixel values at locations in the band along circular arcs centered at the location $(x_0, y_0)$. A value of 1 is then assigned to the epicardial weight function epiW(y) at the location y if its distribution value exceeds ⅔ of the maximum for the entire distribution; otherwise the value of 0 is assigned. Since the endocardium may not be quite as prominent as the epicardium in the anterior region, a value of 1 was assigned to the endocardial weight function endoW(y) at the location y if its distribution value exceeds ½ of the maximum for the entire distribution; otherwise the value of 0 is assigned.

Because the search is for boundary points, a test was devised to determine whether or not a particular location is in the cavity. The first aspect of the test is to create a second one-dimensional distribution E(y) defined by the average (D(y−10) +D(y−9)+. . . +D(y+9)+D(y+10)/21). The maximum and minimum values of the E(y) distribution are denoted $E_{max}$ and $E_{min}$, respectively. If endoW(y)=1 and $E(y-10)<(2 \times E_{min}+E_{max})/3$, then endoW(y) is increased in value from 1 to 2. This value indicates that the pixel values immediately inside the y location should be within the cavity. A similar test is used to increase epiW(y) from 1 to 2. Thus defined, endoW(y) and epiW(y) provide a measure of the probability that location y is a border point.

While it may seem that choosing a band to be 21=2*min_wall +1 pixels wide is arbitrary, this choice was made because the band needs to be wide enough to detect the endocardial and epicardial borders even if the approximation of the best-fit column $y_0$ from determined as described above is somewhat to the left or right of the true center. The band must also be chosen narrow relative to the diameter of the myocardium. The ratio chosen in this embodiment is between 20% and 25% of the expected diameter.

Once the weighting functions endoW(y) and epiW(y) are determined, a filter operator is applied to simultaneously identify both the endocardial and epicardial borders along the anterior wall. In this embodiment of the invention, if Q(x,y) is the location of a pixel near the column containing $(x_0, y_0)$, then the value of the filter at (x,y) is defined by:

$$V(x,y,k,k+c)=[(s_k-s_{k+c}) \cdot epiW(y_1) \cdot (s_{k+c}-s_k) \times endoW(y_2)]((k-(k+c))$$

where $s_k$ is defined as above, $y_1 < y_2$, $y_1 = y-k$, $y_2 = y-(k+c)$, and c is a constant set to be 1 unit of increment in the preferred embodiment. The factor $s_k - s_{k+c}$ is a measure of the negative of the first derivative. The thickness factor k−(k+c) (i.e., the constant c) forces the estimates of the epicardium and endocardium borders apart. To avoid absurd estimates of wall thickness, this factor is restricted to only those values between the minimum and maximum expected wall thickness in the anterior region. In the preferred embodiment, this value is selected to be reach_a pixels.

The resulting pixel location that gives a maximum for the paired circular arc filters is designated $(x_1, y_1)$, which is a second tentative center-point for the left ventricle. As noted above, the center-point is determined to be located at $(x_0, y_2)$, where $y_2 = (y_0 + r_0 + y_1 - r_1)/2$ and the values $r_0$ and $r_1$ are the distances from the respective tentative centers to the corresponding epicardial border.

Determination of Lateral Borders

In a first preferred embodiment once the center-point is determined, the approximate location of the lateral epicardial and endocardial borders can be determined using a pair of coupled circular arc filters. Because an approximate distance to the posterior epicardial border 13 is already known, and the filters need only be calculated for a single pixel (i.e., the center-point), the computational requirements are very low. In the illustrated embodiment, for both the lateral endocardial and epicardial borders, the process basically comprises computing for each pixel $(x_i, y_j)$ the maximum of a set of numbers $s_2-s_1, s_3-s_2, \ldots$ where each $s_k$ represents the sum of pixel values on 17 radii uniformly distributed along a set of 90° arcs having a radius equal to the posterior epicardial distance ±m/80 pixel lengths. The angles associated with the pixel locations along the 90° arc range from 315° to 45° for the right lateral wall, and from 135° to 225° for the left lateral wall.

Thus, the first step of the inventive method automatically determines the center-point of the left ventricle and reasonable approximations of the location of the epicardial border and the anterior and antero-lateral endocardial border using circular arc filters. Another approach to finding the center-point using elliptical arcs rather than circular arcs is described in the next section.

Determining the Center-Point and Search Regions Using Elliptical Arc Filters

In another preferred embodiment of the present invention, the center-point is determined using elliptical arc filters, in place of the circular arc filters, to search for the anterior epicardial and endocardial boundaries. Because the epicardial and endocardial boundaries along the anterior wall are often quite elongated in appearance, circular arcs occasionally provide unsatisfactory models. Experience has shown that elliptical operators produce a better estimate of the endocardial and epicardial border regions along the anterior ventricle wall. In addition to using elliptical arc filters to search for the endocardial and epicardial border regions, the preferred embodiment of the present inventive method integrates the search for one center-point for both the end diastolic (ED) and end systolic (ES) frames. The center-point integration of both the ED and ES frames is performed to take advantage of the observation that while the posterior filter provides a more reliable estimate of the posterior endocardial and epicardial border regions on the ES frame than it does on the ED frame, the anterior filter provides a more reliable estimate of the anterior endocardial and epicardial border regions on the ED frame than it does on the ES frame.

After approximating the position of the posterior epicardium and the center-point using one of the methods outlined above, first estimates of the positions of the left and right epicardium are calculated. These estimates are made in one preferred embodiment using elliptical arc filters. To increase processing speed, the row in which the search for the left and right epicardial borders is restricted to the row of the first approximation of the center-point previously determined as described above. The first approximation of the center-point is placed in the same column as the "best" column. The center-point is positioned within the best column at a radius which is proportional to the number of rows in the scan line. The number of rows in the scan varies according to the zone (see FIGS. 3a and 3b) in which a point along the posterior epicardium lies. As shown in FIG. 3b, the semi-minor axes b of the arcs which comprise the gradient filters are determined as proportions of the depth of the scan (number of rows contained in a sector). The first approximation lateral filters are elliptical and adaptive in shape. The filters are formed according to the ellipse relation: $x^2/a^2 + y^2/b^2 = 1$, as shown in FIG. 3b.

Figure 7:
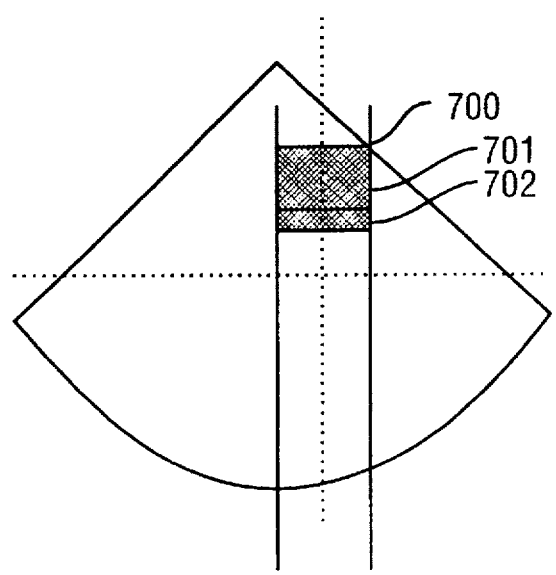
FIG. 7 is a diagrammatic representation showing the upper and lower bounds used in the present invention which restrict the search for the anterior epicardium where 701 indicates the estimated upper and lower bound for anterior epicardial search and 702 indicates estimated wall thickness.

After finding estimates of the left and right epicardial positions, the next step is to estimate the position of the anterior epicardium. This estimate is made using several sub-steps. The first sub-step is to establish search limits to assist in avoiding confusing unimportant image components, such as the anterior chest wall artifact (sometimes referred to as the anterior "hot spot") with the anterior epicardium. A cumulative intensity level distribution is produced in the anterior direction by summing across elliptical arcs which are determined by the distance from the center point and the preliminary right and left epicardial borders previously estimated. A threshold is then established for the distribution as the mean of the distribution plus one standard deviation (i.e. thresh$_{epi}$=mean+1 std. dev.). The maximum and minimum potential rows in which the anterior wall likely will be found are determined to be the first and last rows in which consistent values are found above the established threshold and across all frames. Thus, the search for the anterior epicardium is conducted in the region where the first and last rows of consistent values are found which exceed the established threshold across all frames. This is shown graphically in FIG. 7 at region 700.

A first approximation of wall (muscle) thickness is made as the depth of the scan divided by 15. Because a majority of adult echocardiographs are performed at scan depth settings of 16 cm., this first approximation is a reasonable approximation to the expected wall thickness, which is about 1 cm. for the normal adult left ventricle. Obviously, this divisor may be changed to accommodate different conditions (e.g. child echocardiogram, different scan depth, etc.). Within the bounded search region determined as described above, a second derivative operation is performed. Any position where the derivative values exceed the mean plus two standard deviations (mean+2 std. dev.) is considered to lie within the anterior wall. The upper bound of these positions on each frame between the ED and ES frames is the first estimate of the anterior position on each frame. As with the posterior epicardium position estimate, the anterior position having the smallest variation in position compared to the other frames is found. A final search for the anterior position across all frames is performed within a small rectangular region around this point.

A brief summary of the key sub-steps in the calculated anterior filter is as follows. First, the maximum value, $V_{max}$, along the vertical ray above the center point $(x_0, y_0)$ is defined as the set $L_v=\{(x_0, y):y \leq y_0\}$. Find the first point $(x_0, y_1)$ such that its pixel value is greater than $V_{max}/2$. Replace $y_0$ by min $(y_0, (y_1+y_0+r_0)/2)$. Thus, if the center is low, it will be raised somewhat. This new adjusted center is also denoted by $(x_0, y_0)$. The radius $r_0$ is recomputed as $Y_{rowepidown}-y_0$.

Next, the maximum pixel value along each of the two horizontal rays $L_r+\{x, y_0): x \geq x_0+r_0/2\}$ and $L_r+\{(x, y_0): x \leq x_0-r_0/2\}$ must be computed. The locations where these two maxima occur is denoted by $(x_1, y_0)$ and $(x_r, y_0)$, respectively. For a second time, the maximum value, $V_{max}$ is found along the vertical ray $L_v=\{(x_0, y):y \leq y_0\}$.

Next, the minimum average value, $V_{min}$, of all small rectangles (of a fixed size) with centers on $L_v$ and y values $\geq y_0-r_0$ is computed. The value $V_{min}$ is a measure of the average gray level of the cavity. Next two epicardial thresholds $thresh_{epi1}=2V_{max}/4$ and $thresh_{epi3}=3V_{max}/4$ and two endocardial thresholds $thresh_{epi2}=(2V_{max}+2V_{min})/4$ and $thresh_{endo3}=(3V_{max}+V_{min})/4$ are established.

For pairs of pixel locations $(x_0, y_{epi})$ and $(x_0, y_{endo})$, where the values are above $thresh_{epi}$, and $thresh_{endo}$, respectively, the sums for values of $x \in [x_0-\frac{2}{3}r_0, x_0+\frac{2}{3}r_0]$ along elliptical arcs of the form $x^2/b^2+y^2/a^2=1$ are computed, where $b=y_{epi}-y_0$ and $a=x_r-x_0$ whenever $x \geq x_0$ and $a=x_1-x_0$. To account for the fact that the region outside the myocardium along the anterior wall usually has low pixel values, the sum of the pixel values along a similar elliptical arc is subtracted, where $b=y_{epi}-step$. For the sum along the endocardial boundary, a similar concentric elliptical arc with $b=y_{endo}-y_0$ is formed. Because the cavity usually has low intensity values, the pixel values along an elliptical arc with $b=y_{endo}-y_0$ step are subtracted. Because the output value of the filter is often maximized when $y_{endo}$ is on the inside of the epicardial boundary, particularly at the ES frame, the result is multiplied by the factor $y_{endo}-y_{epi}$.

The two y locations, $y_{epi}$ and $y_{endo}$, are then identified, where the two maximum output values of the filter occur. Next, the anterior index is calculated in the same manner that the posterior index was calculated. Because the $x_0$ coordinate of the center returned by the posterior filter is usually a very reliable estimate, the anterior is only calculated at locations $(x_0, y)$, where y is above $y_0$.

As described above, the x and y coordinates $(x_p, y_p)$ define the locations within the image where the output value returned by the posterior "circular arc" matched filter attains its maximum value (defining the posterior epicardial border). Because the posterior filter has been found to provide a reliable estimate of the vertical line which passes through the center of the left ventricle, the anterior filter is preferably computed only at the (x, y) locations where $x=x_p$. Thus, the center of the left ventricle is defined as $(x_p, (y_a+y_p)/2)$, where $y_a$, is the y coordinate of the border point where the value returned by the anterior elliptical arc filter is maximized.

One key to the inventive method of searching for the anterior epicardium is beginning the search using gross estimates and working toward a final selection in progressive steps. Another key feature of the present method is the use of cumulative distributions and derivative operations that vary in size with the image and structures being sought. Also, the present method takes advantage of the temporal redundancy of the data in the multiple frames in the final selection process.

Figure 8:
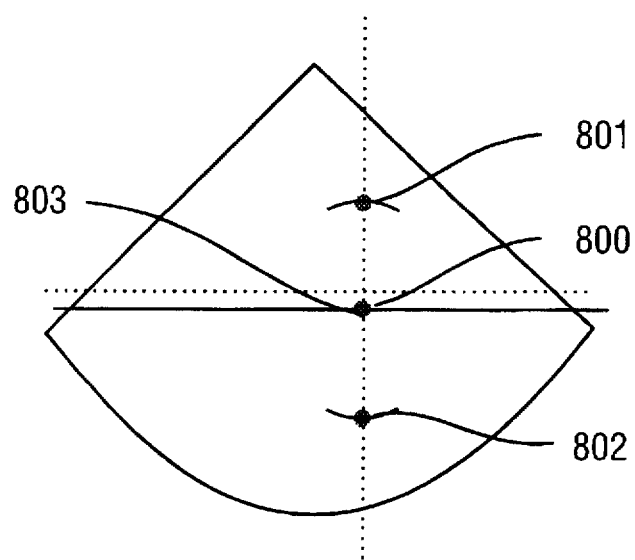
FIG. 8 is a diagrammatic representation showing the determination of the center-point, which is calculated as the midpoint between the anterior epicardial point and the posterior epicardial point determined in accordance with the inventive method where 801 is the anterior epicardial estimate, 802 is the posterior epicardial estimate and 803 is the final center point.

As shown in FIG. 8, once the anterior borders on all of the frames are determined, the center-point 800 on all the frames is calculated as the midpoint between the anterior epicardial point and the posterior epicardial point determined as described above. The final center-point is determined on the ES frame. Any translation of the center-point due to movement of the left ventricle can be calculated from the movement of the center-point over time. The remainder of the search for the final epicardial and endocardial border regions on all frames in systole are based upon the ES center point.

Thus, the first step of this preferred embodiment of the inventive method automatically determines the center-point of the left ventricle and reasonable approximations of the location of the epicardial border and the anterior and anterolateral endocardial border. A first preferred approach uses circular arc filters to estimate the position of the anterior epicardium border region, while a second preferred approach uses elliptical arc filters.

Determining Best-Fit of Elliptical Arc Model

While the epicardial and endocardial borders are oval in appearance, attempts to model these edges with a true ellipse will be frustrated by the fact that the motion and surface of the heart exhibit numerous irregularities. To avoid the instabilities encountered with such an approach, in this embodiment the epicardial and endocardial borders are modeled by curves formed as a union of six elliptical arcs spliced together. Four of the arcs are used to model the entire epicardial border, while the other two arcs model the anterior endocardial border 10. The gap between the best-fit pair of inner and outer arcs provides a measure of wall thickness along the anterior wall. The use of paired inner and outer arcs helps prevent the identification of the endocardial border as the epicardial border, or vice versa.

Using the $(x_0, y_2)$ center-point determined by either method described above, the echocardiographic image is divided, in one preferred embodiment, into angular sectors (e.g., 11.25° per sector). For each sector, a one-dimensional amplitude distribution is generated that represents the cumulative gray level (or intensity) at a given distance across a narrow arcuate region centered on the center-point.

For example, if the radius is started at inner_radius_a pixel lengths, and increased by reach_a pixels for each amplitude distribution computation, then all of the pixel intensities lying on each 11.25° arc at inner_radius_a pixel lengths are summed and scaled to the cumulative intensity level of all of the pixel values in the wedge-shaped region from the center-point to inner_radius_a pixel lengths, then all of the pixel intensities lying on each arc at inner_radius_a+reach_a pixel lengths are summed and scaled to the cumulative intensity level of all of the pixel values in the wedge-shaped region from the center-point to inner_radius_a+reach_a pixel lengths, etc.

This method thus weights outer arcs more than inner arcs, since outer arcs contain more pixels along the arc length. Such weighting has some advantages in helping to distinguish the epicardial border from the endocardial border. However, if desired, the pixel counts may be normalized to give equal weighting regardless of radius, or only the pixels laying on a single ray (e.g., the radius defining one of the two borders of a sector) may be summed in the amplitude distribution.

To further distinguish amplitude distribution counts that represent significant intensity differences, the first derivative is computed for each of the amplitude distributions. In the illustrated embodiment, a new array of amplitude distribution of values $H_i'$ is computed by the equation $H_i'=H_i-H_{i-1}$. The effect of computing the first derivative amplitude distribution is to emphasize the magnitude of any differences between pixel values.

After computing the first derivative amplitude distribution for each sector, the values of each amplitude distribution are scanned to determine the two peak values (with the constraint that the peaks be at least 7*min_wall/10 pixel lengths apart). In the amplitude distributions representing angles of 45° through 155° (the approximate location of the interventricular septum), the locations of the highest two peaks of the negative of the first derivative are also determined and saved.

Figure 9:
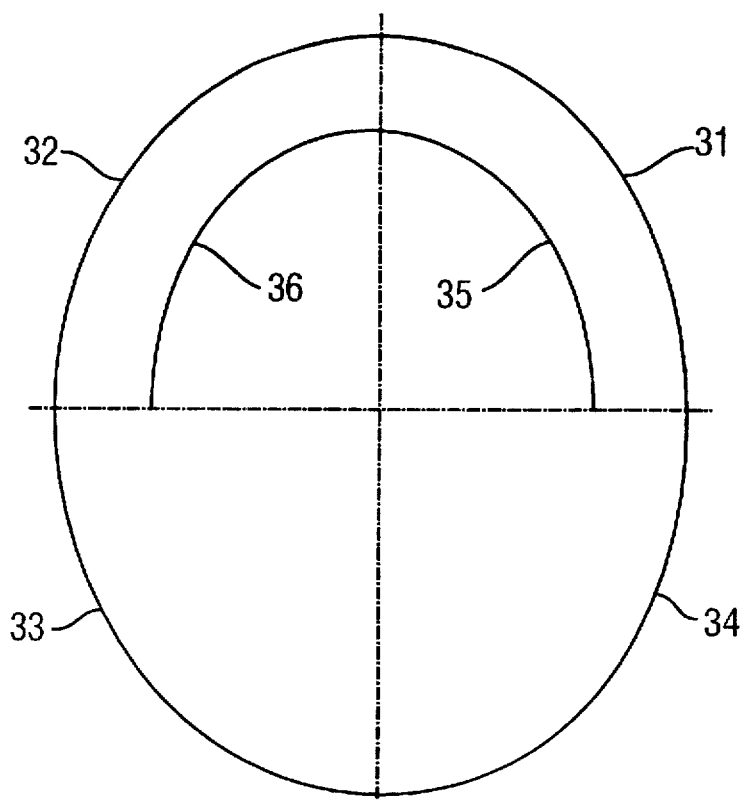
FIG. 9 is a diagrammatic representation of the six elliptical arcs used to model the epicardial and endocardial borders of an echocardiographic image in accordance with the present invention 280 polar data; 281 internal data path; 282 posterior filter that runs in the polar data; 283 phantom data; 284 phantom image that exists as look-up; 285 refinement anterior, and right and left filters run in phantom data; 286 epicponits+anterior wall thickness+Figures of merit; 287 scan conversion; 288 option 1; 289 is a regional automatic amplification as a preprocessing option; 290 cartesian data; 291 NTSC video output; 292 IF auto adjust/optimize selected; 293 regional automatic 2-dimensional gain adjustment; 294 technologist manually optimizes 2-dimensional gain controls; 295 IF manual adjust/optimize selected; and 296 display 4 (5) points in near real-time; color coded for quality and position feedback to Tech.

The next step of the process is to choose a set of spliced elliptical arcs which best-fit the epicardial border and anterior endocardial border. Since a single ellipse will not fit either border closely, this embodied process selects a set of six best-fit elliptical arcs (each comprising a quadrant of an ellipse) having the ends "spliced" together, as shown in FIG. 9. The six elliptical arcs are labeled 31 through 36.

The equation for a vertically-oriented ellipse centered at the origin is $x^2/b^2+y^2/a^2=1$, where a is the length of the semi-major axis and b is the length of the semi-minor axis of the ellipse. A quadrant of an ellipse is therefore determined by the same parameters a and b. Thus, with respect to the echocardiographic image under analysis, tentative elliptical arcs comprising a quadrant of an ellipse are compared for a best-fit to the first derivative amplitude distributions for a corresponding quadrant of the epicardial or endocardial border.

Simplifying constraints reduce the computational requirements in the preferred embodiment. The origin for each elliptical arc is the center-point. It has been found that the distance computed from the center-point to the posterior epicardial border 13 determined by the circular arc filter process is quite reliable. Therefore, in the preferred embodiment of the invention, that distance is considered to be a constant as the value for the semi-major axis of elliptical arcs 33 and 34 in FIG. 9. The distance from the center-point to the anterior epicardial border 11 has been found to be not a reliable estimate, so a small range of values (e.g., three to five) around the nominal computed value may be used as the possible lengths for the semi-major axis of elliptical arcs 31 and 32. The computed distances from the center-point to each of the lateral epicardial borders are used as the lengths for the semi-minor axis for elliptical arcs 32 and 33, and 31 and 34, respectively. (If need be, a range of values around the nominal lateral border distances may be used). Similarly, initial values for the semi-major and semi-minor axes of the elliptical arcs 35, 36 are chosen from the computed values for the anterior endocardial border 10 and the lateral endocardial border.

A further constraint requires that the lengths of the semi-major and semi-minor axes for the anterior epicardial and endocardial elliptical arcs differ by at least 7*min_wall/10 pixel lengths (i.e., the minimum wall thickness is 7*min_wall/10 pixels). Another constraint is that parameter a can be no more than double the size of parameter b. Thus, the shape of the epicardium is assumed to be relatively round rather than oblong. Lastly, the inner elliptical arcs 35, 36 are paired with the outer elliptical arcs 31–34 for purposes of determining a best-fit to the amplitude distribution data.

These constraints establish a set of possible arc pairs resulting from the combinations of elliptical quadrants that meet these constraints.

Within these constraints, the coordinates of the possible elliptical arc pairs (i.e., the inner arcs 35, 36 and outer arcs 31–34) are compared against the peak values of the first derivative amplitude distributions, and a "figure of merit" N is computed for each pair of arcs. In the illustrated embodiment, N is computed in accordance with four rules: (1) N is initially set to zero for each pair of arcs being evaluated; (2) if a first derivative amplitude distribution representing an angle between 0° and 180° has a peak within three pixel lengths of the arcs 35, 36 representing the endocardial border, N is increased by one; (3) if a first derivative amplitude distribution representing an angle between 155° and 427° (i.e., from 155° counter-clockwise around to 67°) has a peak within m/80 pixel lengths of the arcs 32, 33, 34, 31 representing the epicardial border, N is increased by one; (4) if the negative of a first derivative amplitude distribution representing an angle between 45° and 155° has a peak within m/80 pixel lengths of the arcs 31, 32 representing the anterior epicardial border, N is increased by one.

The parameters a and b are varied as described above to define a range of arc pairs. The pair of inner arcs 35, 36 and outer arcs 31–34 with the largest value of N is considered to be the best fit to the amplitude distribution data, and thus define an elliptical arc model for the epicardial border and anterior endocardial border.

Of the three end-systolic echocardiographic frames analyzed, the one giving the highest value for N is chosen as the optimal end-systolic frame.

The steps set forth above with respect to automatic determination of a center-point, and modeling the epicardial and endocardial borders with joined elliptical arcs, are repeated for sets of three echocardiographic image frames selected from mid-systole and end-diastole.

Figure 10A:
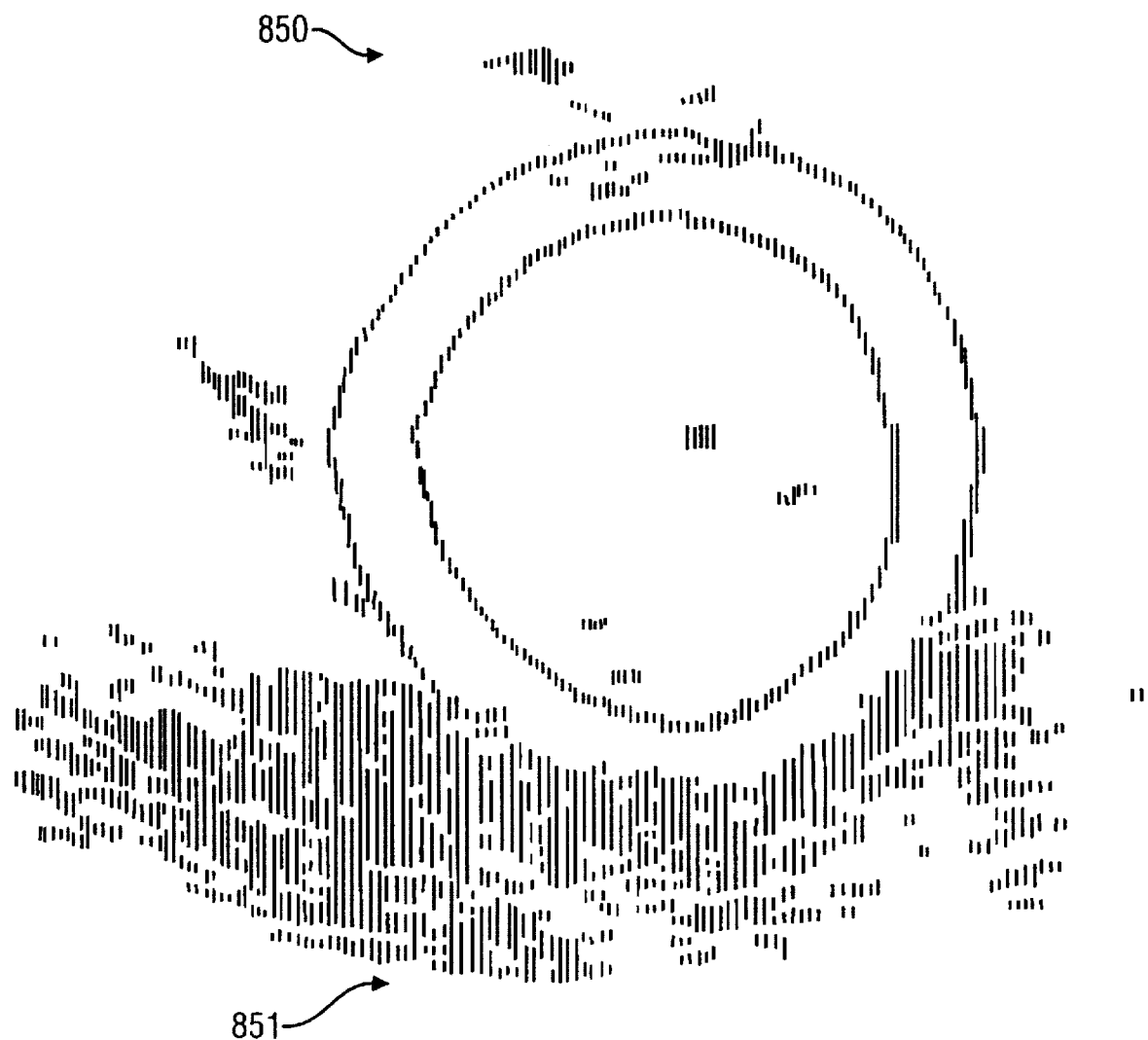
FIG. 10a is a photograph of an echocardiographic image showing the center-point, endocardial border, and epicardial border at end-diastole, as defined by the automated method of the present invention 850 shows/images/popp 1 cin Frame 0 and 851 is an automated algorithm: Center, endocardium, and epicardium.
Figure 10B:
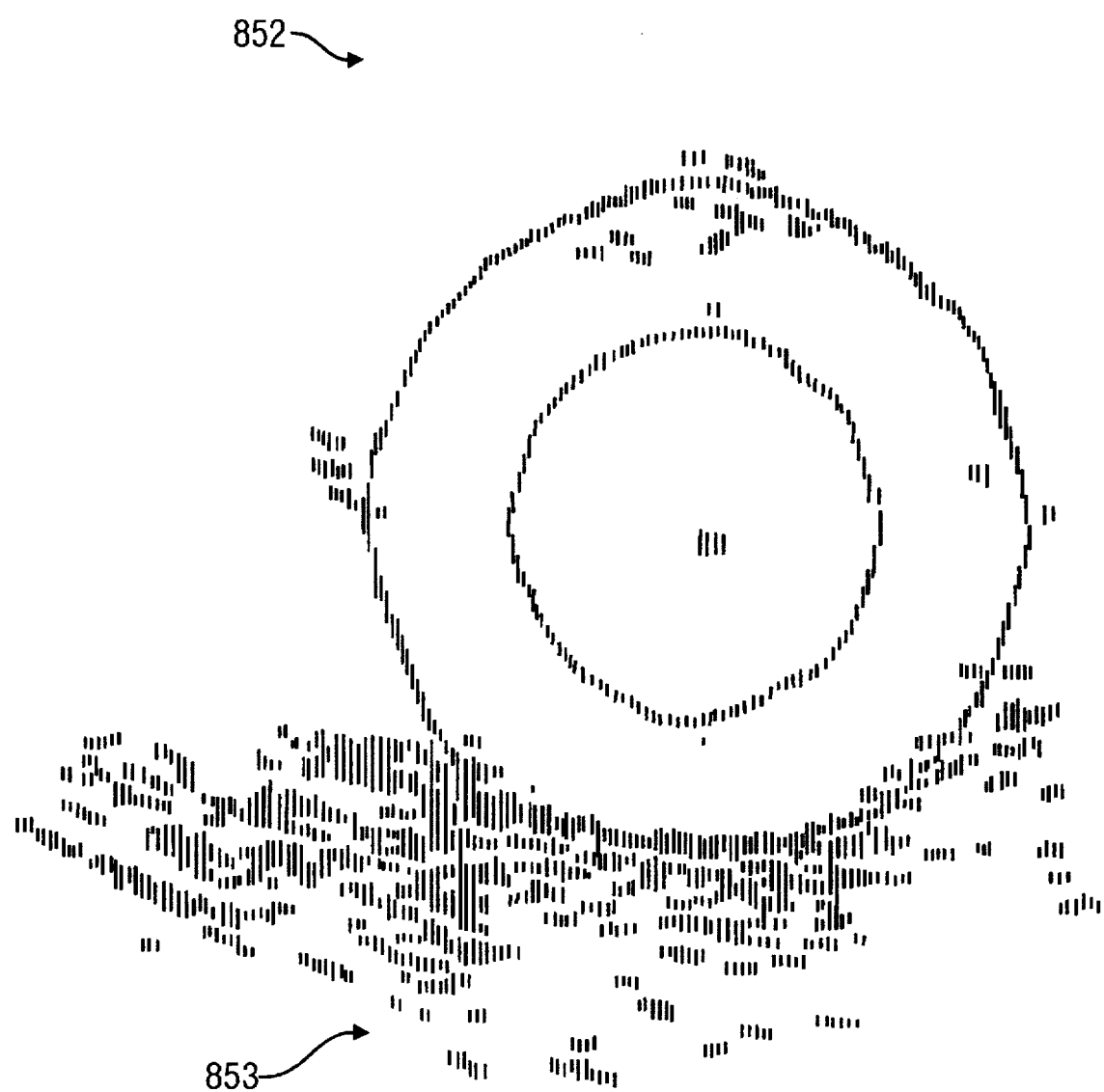
FIG. 10b is a photograph of an echocardiographic image showing the center-point, endocardial border, and epicardial border at end-systole, as defined by the automated method of the present invention 852 is/images/popp 1.cin Frame 9 and 853 is an automated algorithm: Center, endocardium and epicardium.

The ventricular center and the elliptical models thus determined for end-systole, mid-systole, and end-diastole may then be superimposed over the corresponding echocardiographic images on a display screen. FIG. 10a is a photograph of an echocardiographic image showing the center-point 40, endocardial border 41, and epicardial border 42 at end-diastole defined by an automated method in accordance with the present invention. FIG. 10b is a photograph of an echocardiographic image showing the center-point 40, endocardial border 41, and epicardial border 42 at end-systole defined by an automated method in accordance with the present invention.

Because the above process generates a model of the endocardium, by using well-known mathematical formulae, the volume encompassed by the elliptical model can be computed.

Another Preferred Method of Determining Figures of Merit of Elliptical Arc Models In another preferred embodiment of the present inventive method, following the center-point determination, the left and right epicardial searches are repeated. The left and right epicardial border regions are searched a second time using elliptical filters which are dynamically determined by the radius to the anterior and posterior walls, the semi-major axes, and by the distance from the center-point to the right and left border regions. The search for the right and left epicardial border regions is shown diagrammatically in FIG. 11.

Figure 11:
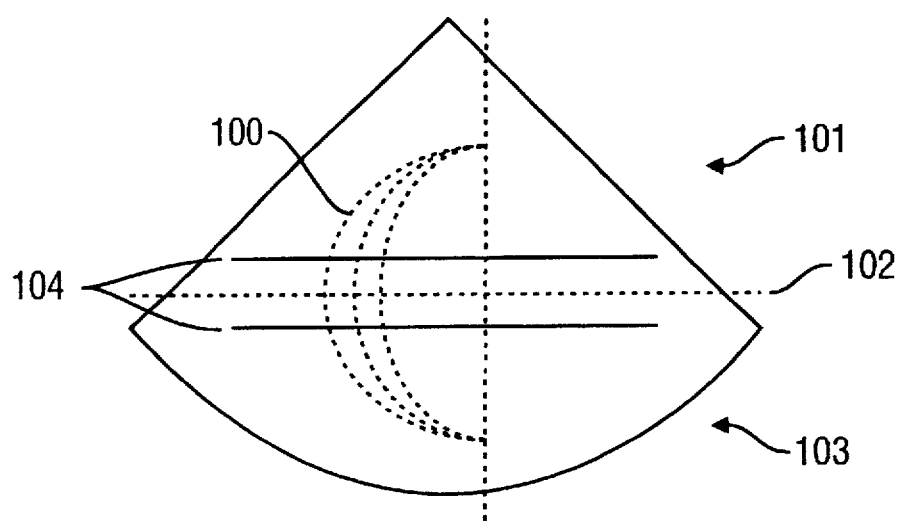
FIG. 11 is a diagrammatic representation of the elliptical arcs used to model the right and left epicardial borders of an echocardiographic image in accordance with the present inventions 100 is revised elliptical filter shapes for second search for the left epicardium; 101 is the anterior epicardium; 102 is the center point; 103 the posterior epicardium and 104 is the limits within which the left and right filters are calculated.

As shown in FIG. 11, the region for computation of the left and right filters is limited to a range of approximately 25% of the major epicardial diameter of the ventricle determined as described above. The region for computation is limited to reduce processing time and to reduce the deleterious effects of erroneous image data. The radial separation between non-zero weights of the filter are dynamic and calculated as proportions of the vertical diameter of the left ventricle. The radial separation between the non-zero weights of the filter are calculated to optimize the separations and produce the best gradient information. Also, the calculations ensure that the search will not produce a gradient which reaches across from inside the endocardium to outside of the epicardium. While three elliptical arcs are shown in FIG. 11, the elliptical arc shape is adjusted at every pixel value to the left and the right. The elliptical filters are dynamic and matched in size, shape, and the spacing of the non-zero elements on each frame of the image. The details concerning determining the best-fit of an elliptical arc model is described in detail below.

Figure 12:
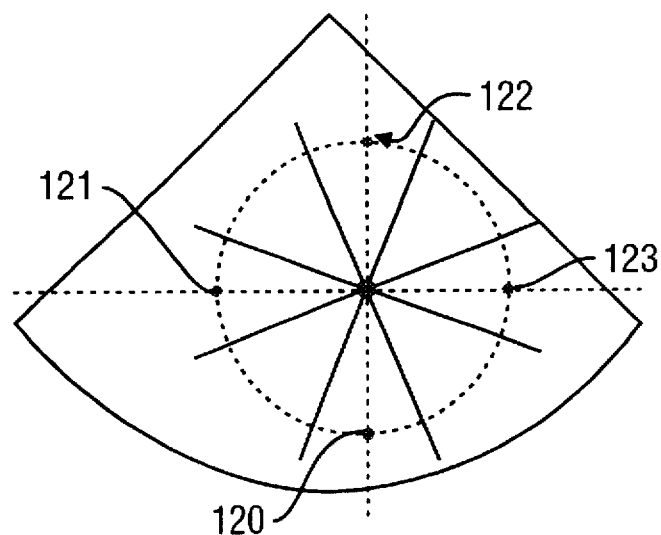
FIG. 12 is a diagrammatic representation showing how the epicardial boundary is divided into several equiangular regions of cumulative intensity value distributions which are used in calculating figures of merit for the elliptical arc models in accordance with the present invention.

As shown in FIG. 12, once the center-point and epicardial points that define the spliced elliptical arcs which estimate the epicardial boundary region are determined, several equiangular regions are computed wherein the regions contain cumulative gray level distribution of pixels at selected radial distances from the center-point. As described below in more detail, the equiangular regions are used to adjust the epicardial border and to help define the endocardial border. In one preferred embodiment, 64 equiangular regions are computed. In order to calculate a figure of merit or best-fit index for the elliptical arc filters, the regions are preferably grouped into 8 equiangular regions. Within each region, the cumulative distributions comprising each region are averaged at each radial length. The averages are computed again along the elliptical arcs parallel to the estimated epicardial order. The distributions are summed along the elliptical arcs parallel to the epicardial border. In each of the 8 regions, the overall average intensity level along the arc corresponding to the epicardial curve is computed. The radial average, or normalized, distributions are calculated in order to reduce the weight of small regions of clutter or noise near the center-point.

Thus, the figures of merit of the elliptical arc filters are calculated as part of the process of defining the epicardial and endocardial position estimates. In this preferred embodiment, these figures of merit are calculated in 8 directions away from the center-point. The figures of merit indicate the quality of the border data in multiple regions. As described in more detail below, the figures of merit can be used for enhancement of the image either under manual control or using an automatic feedback mechanism within the ultrasound apparatus.

Figure 13:
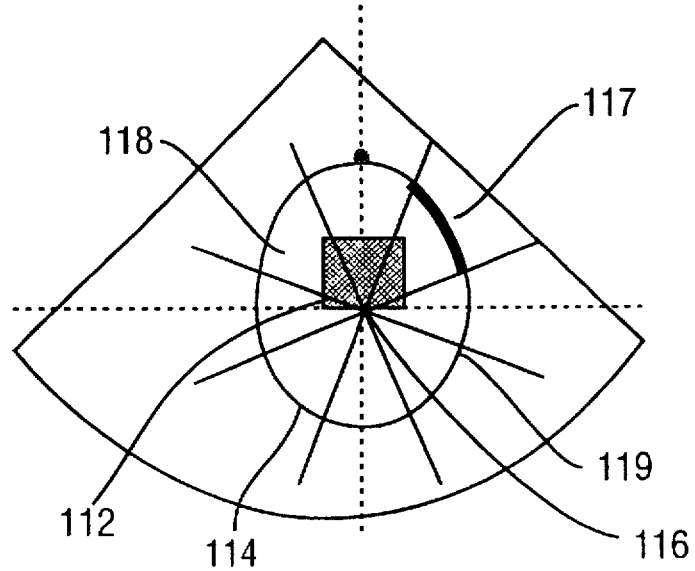
FIG. 13 is a diagrammatic representation showing the definition of a small region within the chamber cavity which is used in calculating the figure of merit for the elliptical arc model in accordance with the present invention 117 is the elliptical arc for calculating the average estimated epicardial gray level in this region; 118 is the region for calculating average cavity gray level; and 119 is the estimated epicardium.

The next step in calculating a figure of merit for the elliptical arc model is to define a small region within the chamber cavity. As shown in FIG. 13, a region 112 is defined within the chamber cavity 114 defined by the estimated position of the epicardium. The region 112 is preferably defined having a lower limit equal to the row of the center-point 116, an upper limit equal to ½ of the anterior radius, and having a width equal to the columns at plus and minus ¼ the radius to the left and to the right of the column of the center-point. By defining the region 112 in this manner, the region 112 is expected to have an optimal approximation of "background" echo signal levels, otherwise referred to as the "blood pool".

The average intensity value or "chamber" gray level of the region 112 is calculated and compared to the intensity values of the elliptical arcs defining the epicardium. The quality of the border data is computed in multiple regions, preferably 8. If the epicardium intensity data is less than or equal to the chamber gray level within its octant, then the epicardial data is considered to be poor. If the gray level of the epicardium within an octant is greater than the chamber mean but less than the mean gray level for the octant plus ½ of its standard deviation, the epicardial data is questionable and should be considered with caution. However, if the epicardial gray level for the octant is greater than the mean of its octant plus of its standard deviation, then the estimated position is likely good.

Image Enhancement Using Figures of Merit in Ultrasound Equipment

Figure 14:
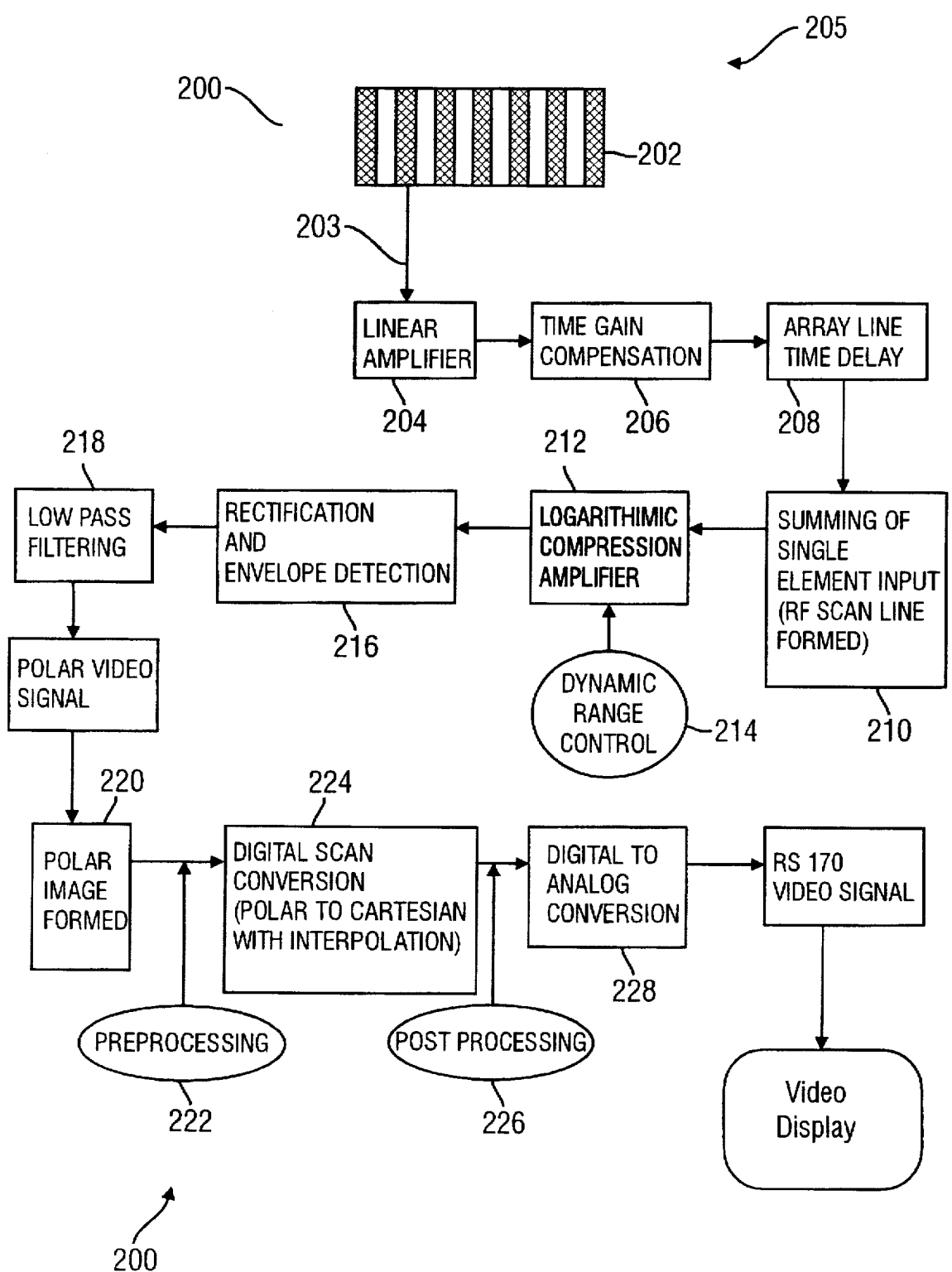
FIG. 14 is a block diagram showing the data path in an ultrasound imaging system which employs feedback provided by the figures of merit for the elliptical arc models in accordance with the present invention 200 is a transducer; 203 is signal path for each element acting in receive model; and 205 is phased crystal array.

As described above, the figures of merit can be used to provide feedback information for image enhancement purposes. FIG. 14 shows a data path in an ultrasound imaging system 200 which employs feedback provided by the figures of merit calculated as described above. As shown in FIG. 14, the figures of merit can be introduced at several points in the imaging system to assist in adjusting and enhancing image quality. The ultrasound imaging system 200 preferably comprises a phased element array transducer 202, a linear amplifier 204, a time gain compensation block 206, an array line time delay block 208, a summing block 210 which sums single element inputs and forms the RF scan line, a logarithmic compression amplifier 212 having dynamic range control input 214, a rectification and envelope detection block 216, a low pass filter 218 which outputs polar scan line data and which forms a polar image 220, a preprocessing block 222, a digital scan conversion block 224 which converts the image from polar coordinates to Cartesian coordinates, a post processing block 226, a digital-to-analog converter 228 which generates an RS-170 video signal that is displayed on a video display 230.

One of the problems encountered when using the figures of merit in an existing ultrasound device is that, because the image data is typically stored in a polar coordinate format, the image dimensions are 512×128 pixels, i.e., the image has 512 rows and 128 columns. Thus, an image of the heart in the parastemal short-axis view is not round or oval in appearance, but rather somewhat "pear-shaped", narrowing with increasing distances from the transducer 202. As a consequence, if the computations are performed on polar-formatted images, the circular arc filters used as described above in the calculation of the posterior filter must be replaced by parabolic arc filters to better match the shape of the epicardial border regions. A Fast Fourier Transform (FFT) convolver may be used to supply real-time estimates of the posterior epicardial positions.

As shown in FIG. 14, and described in more detail below with reference to FIG. 15, the posterior filter can be computed using the polar image data 220. The posterior filter calculation can be performed on a "phantom image" which only exists as a look-up in the ultrasound imaging system 200. As outlined diagrammatically in FIG. 15, the posterior filter and phantom coordinate data can be processed for the figures of merit calculation and estimated epicardial positions as described above.

As shown in FIG. 14, the standard time gain compensation block 206 can be replaced by a 2-dimensional time gain compensation block. The 2-D time gain compensation block preferably comprises either a "true" 2-D access gain compensation device which is applied to each scan line, or a lateral gain compensation device similar to that described in U.S. Pat. No. 5,257,624 to Fraser, et al. In accordance with the Fraser patent, the time gain compensation block 206 might comprise an altered version of an operator-adjusted lateral gain control structure for the ultrasound imaging system 200 which enables an operator to adjust the gain of one or more scan lines independently of the gain of other scan lines. This device thus provides the option for manually selecting a set of scan lines where, if the user determines that the image is suboptimal, the user can increase the gain along a predetermined set of scan lines which cover the region. Typically, the set of scan lines is equal to 16 scan lines. The version of this device shown as block 206 in FIG. 14 allows the gain to be set at random depths along random lateral positions where features of the image suggest that a structure is present, such as the posterior epicardium, anterior left ventricle wall, or right or left lateral wall. Gain compensation is thus applied to each scan line of the image. The automatic control is dependent upon the position of the epicardial points and their associated figures of merit.

Figure 15:
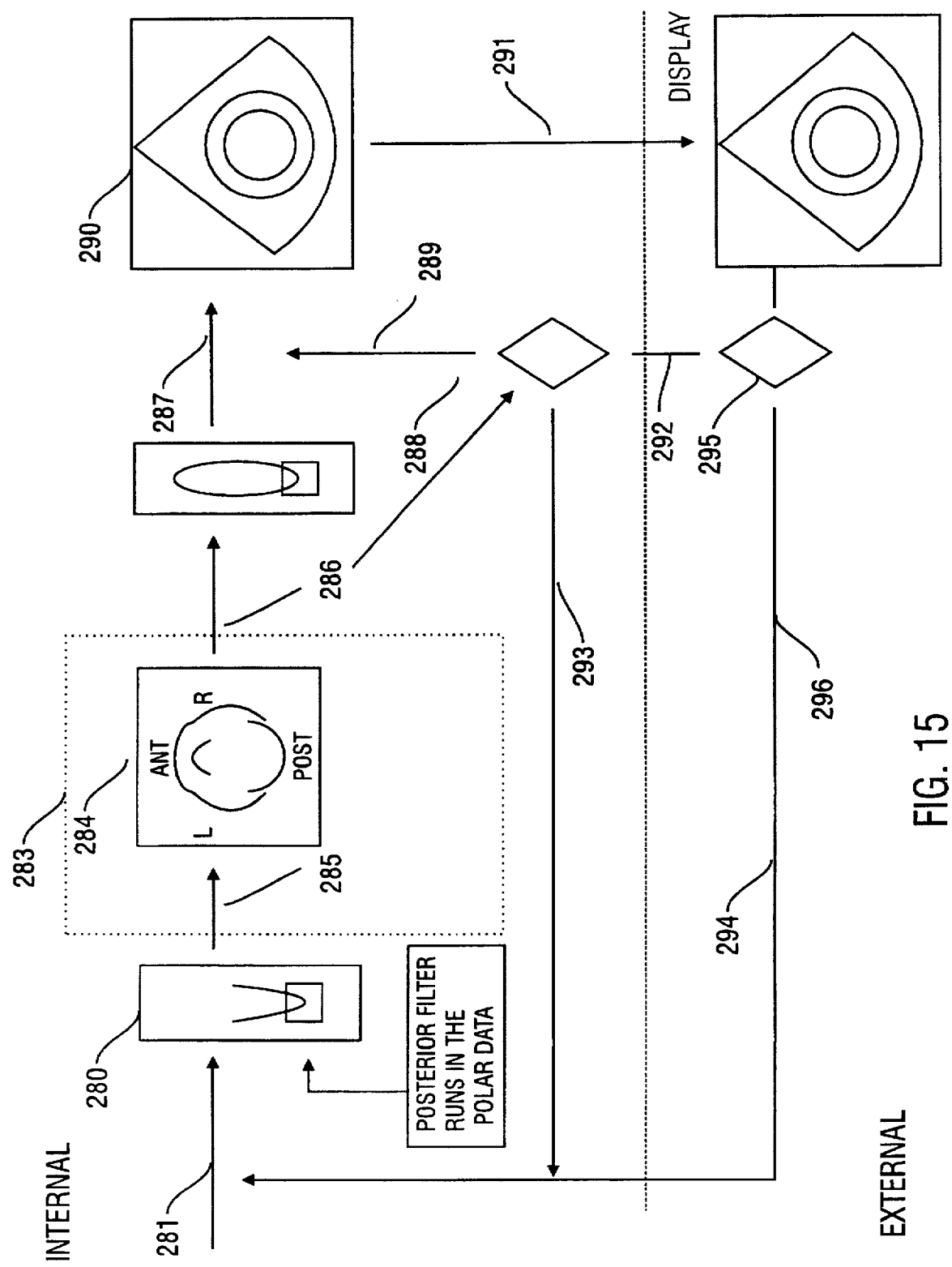
FIG. 15 is a diagrammatic representation showing how the posterior filter and phantom coordinate data can be processed for the figures of merit calculation and estimated epicardial positions in accordance with the present invention.

Referring to FIGS. 14 and 15, the posterior filter is calculated using the polar formatted image data 220. The refinement of the image, including the search for the anterior, right, and left epicardial border regions are performed within the phantom image. This calculation produces the epicardial point estimates, an estimate of the anterior wall thickness, and figures of merit associated with the elliptical arc filters. As shown in FIG. 15, the figures of merit can optionally be used in a number of ways. For example, in one option, the figures of merit can be used to facilitate an automatic regional amplification as a pre-processing step. As shown in FIGS. 14 and 15, regional amplification or application of the above-mentioned enhancement methods can be performed as a pre-processing step by pre-processing block 222. Another option is to use the figures of merit to perform an automatic regional 2-D gain adjustment as described above with reference to the time gain compensation block 206. If the system is set to accept a manual adjustment, a technologist can use the figures of merit to manually optimize the 2-D gain controls of the gain compensation block 206. As shown in FIG. 15, the figures of merit can be presented to the operator or technologist to warn the operator that optimal image characteristics are not present. The image quality could be improved by having the ultrasound system 200 adjust the gain in the regions identified by the figures of merit as suboptimal. To accomplish this without operator interaction, a feedback loop must be established between the filter calculations and the 2-D time gain compensation block 206.

Other alternative uses for the figures of merit are presently contemplated. For example, the figures of merit can be used to automatically trigger the implementation of other types of image processing techniques to improve image quality. For example, image processing techniques such as "ridge finding" and "motion analysis" can be used to enhance the pixels along the lateral walls of the left ventricle. The result of the motion analysis technique can be color-coded in known fashion to indicate motion towards and away from the center of the left ventricle. For example, the borders can be color-coded blue to indicate motion towards the center and red to indicate motion away from the center.

Figure 16:
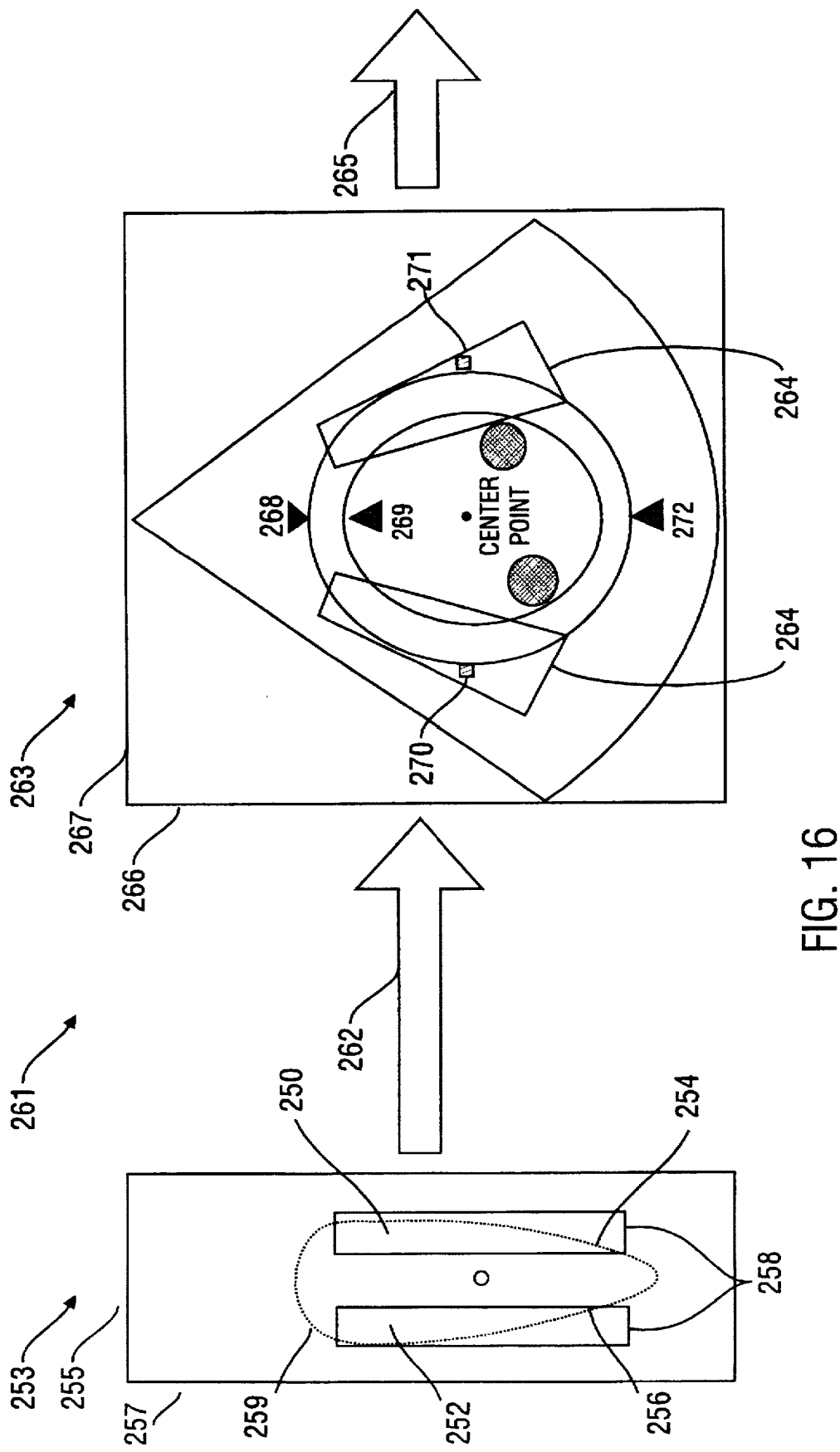
FIG. 16 is a diagrammatic representation showing how the estimated region of interest and figures of merit can be used in automating image enhancement in accordance with the present invention 253 is a polar coordinate; 255 is scan line angle; 257 is depth; 258 is regions for enhancement estimated from epicardial positions; 259 is estimated epicardial position; 260 is USE of estimated region of interest in figures of merit in automated preprocessing enhancement; 261 is scan conversion preprocessing; 262 is amplification of the estimated regions accomplished as a preprocessing step. Degree of amplification chosen by user or set automatically depending on the figures of merit; 263 is Cartesian image in scan convertor; 264 is regions enhanced in preprocessing; 265 is video output to display; 266 is row; and, 267 is column.

Because image "drop-out" is most frequently encountered in the lateral wall on the parastemal short axis view, the positions of the lateral walls can be estimated and gain increased in these regions more than the gain in the remainder of the image. The methodology for performing these image enhancement techniques are shown diagrammatically in FIGS. 16 and 17. FIG. 16 shows how the estimated region of interest and figures of merit can be used in automating the pre-processing image enhancement step. As described above with reference to FIG. 15, the figures of merit can be used in one option to facilitate the automatic regional amplification as a pre-processing step. As shown diagrammatically in FIG. 16, regions for image enhancement 250, 252 can be determined from the estimated positions of the left and right epicardial border regions 254, 256. The regions 250, 252 are determined using the polar-formatted image data 220 (FIG. 14). As shown in FIGS. 14 and 16, the regions 250, 252 can be amplified during the pre-processing step 222 before scan-converting the image to a Cartesian coordinate system via the digital scan conversion block 224. The degree of amplification of the regions 250,252 can be set by a user or automatically. The enhanced image is then transmitted to the video display 230.

Figure 17:
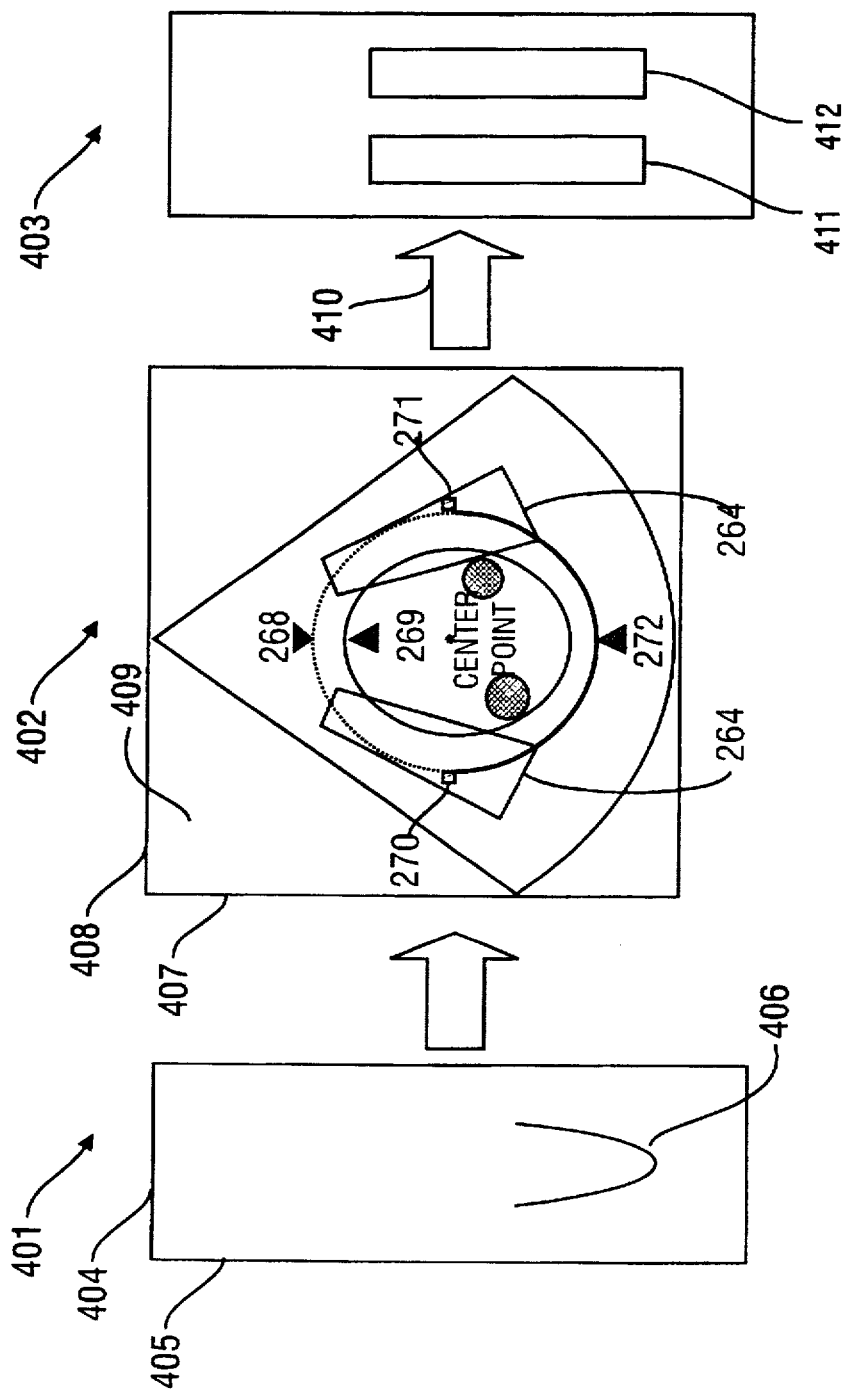
FIG. 17 is a diagrammatic representation showing how the phantom is utilized in calculating the figures of merit and in estimating a search region of interest in accordance with the present invention 401 is a polar coordinate; 402 is Cartesian (phantom) look-up coordinates; 403 is Polar Coordinate; 404 is scan line angle; 405 is depth; 406 is posterior filter run in the polar data; 407 is row; 408 is column; 409 is positions of posterior and anterior right and left epicardium and wall thickness estimated; and, 410 is estimated positions in the polar returned with figures of merit.
Figure 18A:
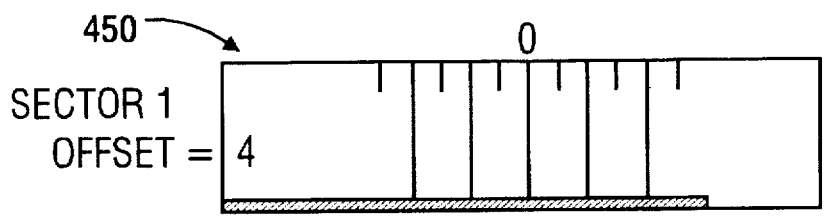
FIG. 18 shows an example set of eight sector cross-correlation powercurves generated by the present invention for determining cardiac wall motion. The variable offset value in each sector indicates the computed estimate of the number of radial units the endocardium has moved in that sector 450 is power curve-systolic motion; 480 is end diastolic frames post injection (time).
Figure 18B:
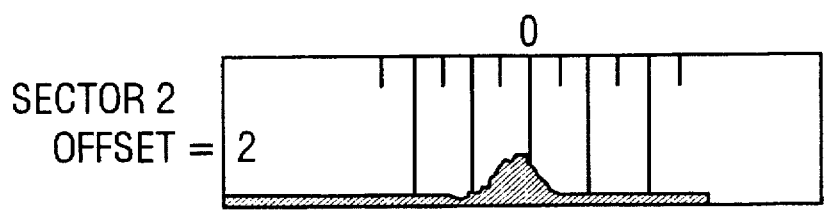
Figure 18C:
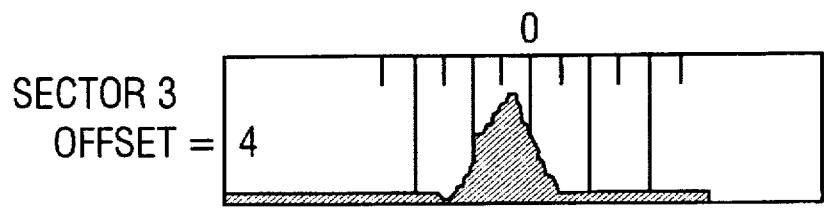
Figure 18D:
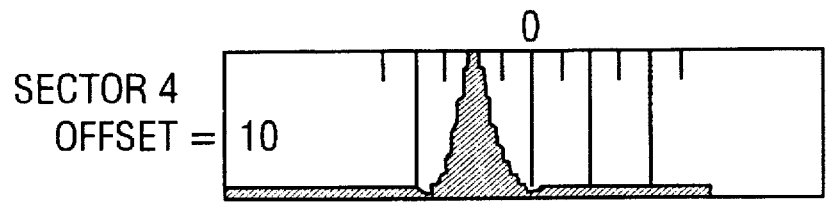
Figure 18E:
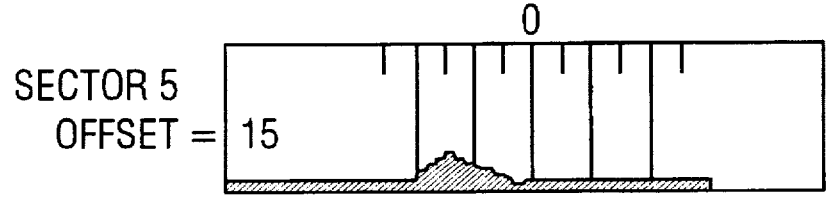
Figure 18F:
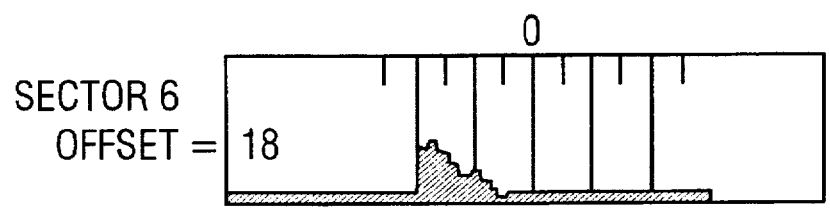
Figure 18G:
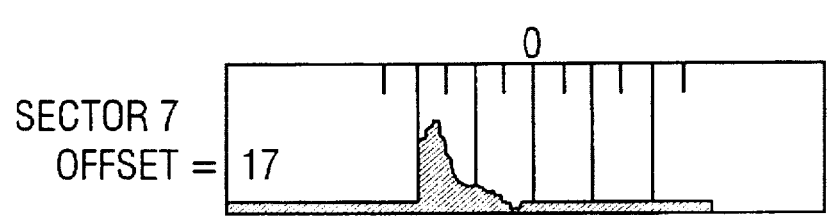
Figure 18H:
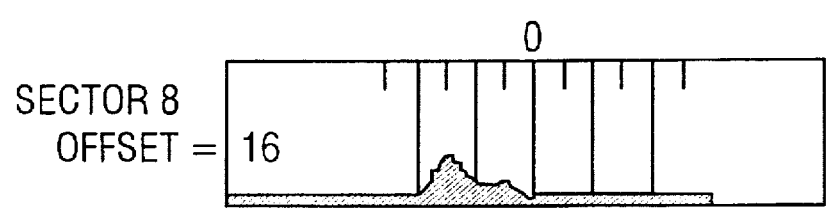

FIG. 17 shows how the phantom image determined as described above with reference to FIG. 14 can be utilized in calculating the figures of merit and in estimating a search region of interest. Using the search techniques described above, the posterior filter can be calculated using the polar-formatted image produced in block 220 (FIG. 14). Once the posterior filter is calculated, the positions of the posterior, anterior, right and left epicardium and anterior wall thickness are estimated using the Cartesian (phantom image) look-up coordinate data. As shown in FIG. 14, the polar-formatted image is scan-converted by the digital scan-conversion block 224. As described above, the figures of merit are calculated as part of the process of defining the epicardial and endocardial position estimates. If the figures of merit are sufficiently low, the 2-D gain pre-processing techniques described above are performed in the regions 260, 262 shown in FIG. 17. The estimated positions and enhanced images are returned to the polar coordinate system for further processing.

The feedback applications described above are intended for use with short axis images, however they are not limited to these views. They may be expanded for use with other views as arc or other types of matched filters are developed for them. The present invention also contemplates using the figures of merit in implementing an "intelligent" ultrasound imaging system which assists in optimizing patient data and ensuring that patient studies are consistent between laboratories.

The feedback applications may also be adapted for use in an "off-line" automated feedback system which improves image quality using any manufacturer's ultrasound equipment. For example, a feedback mechanism might connect to the standard video output of existing ultrasound equipment and provide feedback to a user of the equipment. The internal automatic gain compensation and other image improvement techniques described above would not be implemented with such a system. However, some degree of image improvement can be accomplished in an off-line device and this implementation is presently contemplated.

Detection of Flattened Interventricular Septum

The invention also includes a means for determining the presence of a flattened interventricular septum caused by pressure or volume overload from the right ventricle.

In general, a paired set of straight line filters perpendicular to a radius from the center-point through the septum are applied to the echocardiographic image data in a manner similar to the paired circular arc filters used to detect the anterior epicardial and endocardial borders. The use of paired inner and outer straight line filters helps prevent the identification of the right ventricular side of the septum as the left ventricular side, or vice versa. In a similar manner, a pair of circular arc filters centered on the center-point and directed at an angle of 90° through 180° towards the septum are applied to the echocardiographic image data. A comparison of the best-fit circular arc filters and the best-fit straight line filters to the image data gives an indication of whether the septum is flattened.

In particular, if the septum is flattened, then the pair of straight line filters will provide a better "fit" to the data than will the pair of circular arc filters. Which of the two pairs of filters is a better fit is determined by finding the larger of two integers Nc (a figure of merit for the circular arc filters) and Ns (a figure of merit for the straight line filters). Nc is computed in exactly the same way as the integer N computed in determining the best-fit elliptical arc model described above, with the exception that computation is limited to angles in the quadrant between 90° and 180°.

Ns is computed based upon a one-dimensional amplitude distribution generated in a band oriented along a radius from the center-point through the septum. The amplitude distribution represents the cumulative gray level (or intensity) distribution of pixels from the center-point to a selected radial distance along the band, versus the sum of the gray levels of the pixels across a narrow region at a given distance along the band. Ns is computed to be the sum of N1 and N2. N1 is the number of peaks of the negative of the first derivative of the amplitude distribution data within three pixel units of the straight line drawn between a point P1 representing the epicardial border at 180° and a point Q1 representing the epicardial border at 90° (these points being known from determining the epicardial border as described above). N2 is the number of peaks of the first derivative of the amplitude distribution data within three pixel units of the straight line drawn between a point P2 representing the endocardial border at 180° and a point Q2 representing the endocardial border at 90° (these points being known from determining the endocardial border as described above). If Ns>Nc, the septum is considered to be "flattened".

Determination of Wall Motion

In another embodiment of the inventive method, motion information may be extracted from a set of time varying echocardiographic images. The basic motion of the endocardial surface is radially oriented with respect to a parastemal short-axis two-dimensional echocardiographic image. In other words, motion of the endocardial surface is parallel to the radii emanating from the center of the left ventricle, and the orientation of the endocardium is perpendicular to the radii during any point in time.

Using the center-point determined in accordance with the procedure set forth above, eight one-dimensional amplitude distributions are formed for each of eight 45° sectors emanating from the center-point. The cross-correlation technique is used on each of these amplitude distributions between the frame at end-diastole and the frame at end-systole to detect the wall motion in each of the different regions. A novel feature of this approach is that cross-correlation of the amplitude distributions provides a dynamic matched filter requiring only an imperfect estimate of the endocardial border.

The amplitude distributions are formed in a manner basically the same as set forth above with respect to the thirty-two radial amplitude distributions used for determining the epicardial and endocardial borders. In the same manner, the radial first derivative of each of the amplitude distributions is generated, and the cross-correlation technique is applied to the first derivative amplitude distributions. By using the first derivative, if a significant peak is generated, the location of this peak will appear as the location of maximum cross-correlation. Using the same method as described above for modeling the epicardial and endocardial borders, an estimate of the location of the epicardial and endocardial borders is derived by determining the two peak values of each amplitude distribution.

Because the epicardial border moves at a rate of only about one-half that of the endocardial border, the amplitude distribution values are truncated to zero beyond the point midway between the estimate of the endocardial and epicardial borders. By eliminating the damping effect of the motion of the epicardium, this technique helps to provide more accurate quantitation of the wall motion. Thus, the inventive method provides quantitation of regional wall motion without performing actual border detection. This process maximizes the use of the image information used in quantitation.

The amplitude distribution values from one time period (e.g., end-diastole) are then shifted in a step-wise manner by different radial distances and compared with the corresponding amplitude distribution from a second time period (e.g., end-systole). The amount of radial shift producing the maximum cross-correlation (i.e., statistical correspondence of like-positioned amplitude distribution values from the first time period compared to the second time period) gives an estimate of the amount of wall motion in each sector between the two time frames studied. More specifically, the cross-correlation for each shift position of the amplitude distributions can be computed as the sum of the products between corresponding amplitude distribution values from the first time period and the second time period. The average velocity of the shift can be calculated by dividing the radial shift value by the time difference between the two time frames studied.

The sums of products for each shift calculation can be displayed as a power curve. FIG. 18 shows an example set of 8 sector cross-correlation power curves generated by the present invention for determining cardiac wall motion. The variable offset value in each sector indicates the computed estimate of the number of radial units the endocardium has moved in that sector. The offset value is computed as the pixel shift amount where the power curve is maximized. This peak value is the position of best correlation of the amplitude distribution comparison.

Detection of Signal Loss Across the Interventricular Septum

The invention also includes a test to detect the lack of signal ("dropout") across the interventricular septum between the left and right ventricles. The structure and contractile state of the septum is an important factor in determining the condition of the heart. Dropout across the septum indicates that the echocardiographic image may lack sufficient informational content to properly determine such structural and operational characteristics.

The septum signal dropout test consists of a comparison of (1) the minimum average grey level of a small image region in the cavity of the heart around the determined center-point (which determines a background signal level), with (2) the maximum average grey level of a set of similarly sized regions chosen along a line from the center-point of the ventricle in the direction of the septum (which determines a peak signal level). If the maximum ratio of the peak level to the background level for the series of comparisons is less than two, signal dropout is considered to have been detected.

Figure 19:
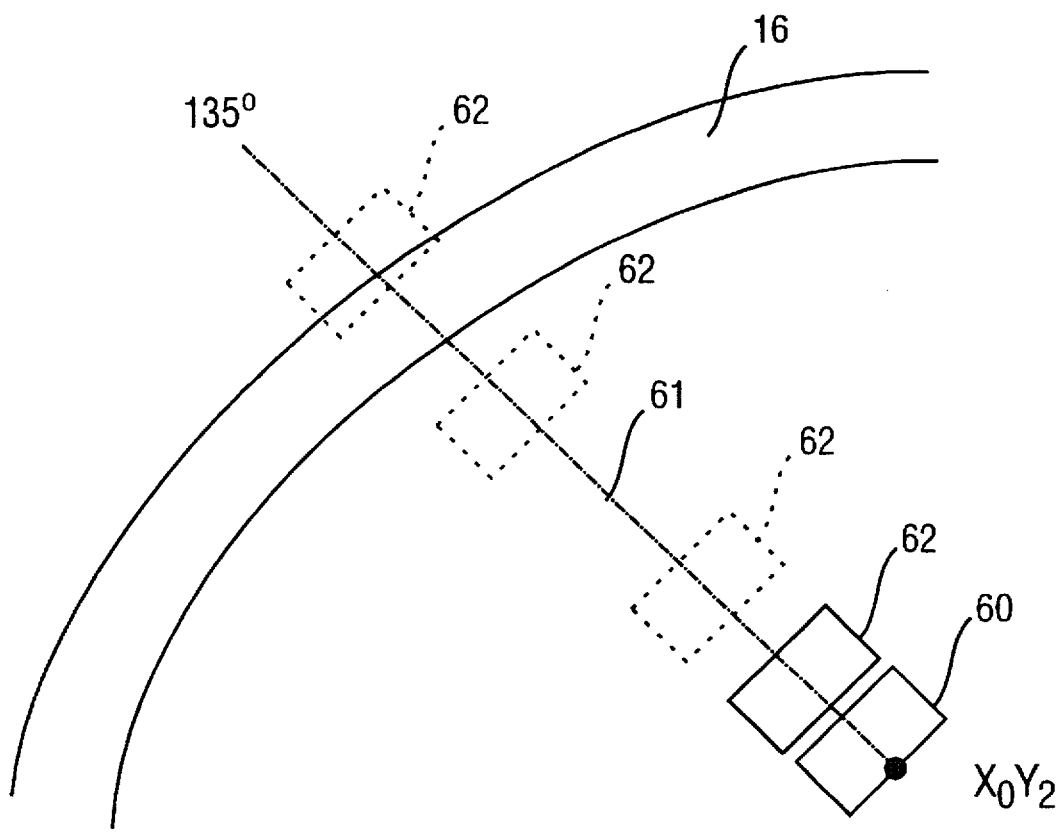
FIG. 19 is a diagrammatic representation of the comparison regions, and their orientation with respect to the heart, used in the illustrated embodiment of the present invention for determining signal loss across the interventricular septum.

FIG. 19 is a diagrammatic representation of the comparison regions, and their orientation with respect to the heart, used in the illustrated embodiment of the present invention for determining dropout across the septum. The first region 60 is defined to be a rectangle that is 2*min_wall +1 pixels wide, centered on a line 61 running from the center-point at an angle of about 135° through the septum 16, and 10 pixels high. The second region 62 is similarly sized. The peak-to-background ratio is computed for a first placement of the second region 62, and then the second region 62 is "slid" out along the line 61 by a predetermined amount (e.g., one pixel length) and the ratio is recomputed. A series of such computations is performed until the second region 62 has been moved out along the line 61 to a point that would necessarily have included the septum (e.g., about 60 or 70 pixel lengths from the center-point). If the maximum value of the set of ratios is less than two, indicating that little difference exists between the background signal level and the "peak" signal level in the direction of the septum, signal dropout across the septum is considered to have been detected.

Blood Pool Classification

The invention further includes a method of performing blood pool classification on a pixel-by-pixel basis, starting from an automated determination of the center of the ventricle.

Blood pool classification attempts to determine whether a particular pixel in an image represents blood or tissue. Using the present invention, the center $(x_0, y_2)$ the left ventricle can be determined, as well as an elliptical arc model of the entire epicardial border, using the techniques described above. In the preferred embodiment, the model parameters can then be adjusted by a percentage (e.g., 80%) of the estimated wall thickness of the organ (determined from the elliptical arc model of the anterior endocardial border) to define a new elliptical arc model that represents a limited region of search for the blood pool. (While the area of the elliptical model, accounting for wall thickness, can be used as a crude estimate of the size if the blood pool, the model does not take into account internal structures within the ventricle that reduce the size of the blood pool). In the alternative, only the center-point $(x_0, y_2)$ is used to apply a blood pool classification procedure.

Using the center-point $(x_0, y_2)$ the left ventricle is divided into a plurality (e.g., 32) of equiangular regions where subsets of the blood pool pixels can be determined in order to estimate regional function. For each equiangular region, the intensity value of each pixel is compared to an average value for all pixels in the region. If a pixel value is greater than a percentage (e.g., 65%) of the average value for a region, the pixel is considered to be structure; otherwise, the pixel is considered to be blood. The average value can be determined simply by summing all of the pixel values in a region and dividing by the number of pixels in the region. If the adjusted elliptical arc model is used, the boundary defined by the model limits the pixels to be evaluated.

In an alternative embodiment, a normalized radial distribution is computed by summing the pixel values in arcuate areas in an equiangular region along a radius centered at the location $(x_0, y_0)$, and then dividing the sum by the area of each arcuate area to give equal weighting to each area regardless of radius. The normalized sum for each arcuate area may then be compared to a threshold value (e.g., a percentage of the average value for all pixels in the region) to determine whether the area comprises structure or blood. This approach averages the pixels in an area to minimize isolated high pixel values caused by noise.

Other methods of evaluating the pixels bounded by the adjusted elliptical arc model can be applied. For example, the image processing technique of dilation and erosion can be applied to the pixels within a region, using a circular or mildly elliptical structuring element to process each pixel, in known fashion. The eroded/dilated pixels may then be compared to a threshold value for determination of inclusion or exclusion in the blood pool.

Other techniques known in the art for classifying blood pool pixels can be used in similar fashion in conjunction with the computed center-point and/or computed region of search generated by the present invention. For example, the center-point $(x_0, y_2)$ can be computed, then a region of search, expressed in rectangular coordinates. Thereafter, the region of search can be translated into polar coordinates, in known fashion, and used to limit the analysis of direct polar scan line data from a diagnostic imaging device (e.g., ultrasound). One such device is described in Rational-Gain-Compensation for Attenuation in Ultrasonic Cardiac Imaging, Melton, Jr., H. E. and Skorton, D. J., 1981 Ultrasonics Symposium, pp. 607–611 (IEEE).

Once the pixels within an image are classified as being in the blood pool, a number of computations can be performed. For example, the number of pixels in the blood pool at end diastole ($b_{PED}$) and the number of pixels in the blood pool at end systole ($b_{PES}$) can be used to approximate the Area Change Fraction for the left ventricle:

$$\Delta A_{LV} = 100\% \times (b_{PED} - b_{PES})/b_{PED}.$$

In a similar manner, the regional area change fraction can be computed for any of the angular regions to took for regional function defects suggestive of ischemic disease.

The area of the left ventricle can be determined by the area bounded by the adjusted elliptical arc model, or by the largest blood pool computation sum. The long axis of the heart can be assumed to be a percentage (e.g., about 150% to about 160%) of the short axis length. The volume of the left ventricle can then be estimated using such models as the hemisphere-cylinder model:

$$V_{LV} = \frac{5}{6} \times A_{LV} \times \text{Long Axis Length}.$$

Method of Automated Video Densitometry

The present invention also includes a method for automating video densitometry, or automatically determining the optical or photographic density of the scanned images. The first step of the inventive method is to obtain the image in a digital format. A sequence of triggered end diastolic images (videotaped or live from the video output of the ultrasound machine) are digitized (usually at 256×240 pixels, 256 gray levels). Preferably, 64 sequential ED frames obtained beginning at the time of peripheral injection of a contrast agent are digitized. In each sequence, control frames are first obtained from the baseline period before any contrast agent injection.

Next, because the images digitized from a video source contain patient data, the ECG, and other irrelevant information, the sides and last row of the sector scan are identified so that only sector scan data (ultrasound data) is processed.

Next, the algorithm detects the approximate position of the endocardial and epicardial borders on a sequence of ED control frames. Because the passage of a contrast agent (e.g., Albunex®) through the right and left ventricular chambers frequently causes severe attenuation of the signal and subsequent loss of myocardial structure in the image, endocardial borders defined during the control period are used as the region of interest for the left ventricular chamber in the sequence of ED frames obtained after the peripheral injection of the contrast agent.

The algorithm establishes a region of interest for the right ventricular outflow tract. This region is trapezoidal in shape. The lower bound of the right ventricular region is defined as the anterior septal surface. The remaining three boundaries are defined by the edge of the scan on the left, an anterior bound at 20% of the left ventricular epicardial diameter anterior from the anterior septum, and a right bound at 10% of the left ventricular diameter to the right of the midline of the left ventricle.

To ensure that the left ventricular endocardial border and the right ventricular outflow tract region of interest are properly registered on all frames throughout the respiratory cycle, the position of the posterior epicardium on each frame following injection of the contrast agent is approximated by computing the posterior circular arc filter, and translating the regions of interest by the difference in position of the filter as compared to the position on the first control frame.

The mean pixel intensity for the left ventricular chamber is calculated for the pixels enclosed by the approximate endocardial contour. Similarly, the mean pixel intensity of the right ventricular outflow tract is calculated. For each of the control ED frames, the mean pixel brightness is considered the background brightness.

Figure 20A:
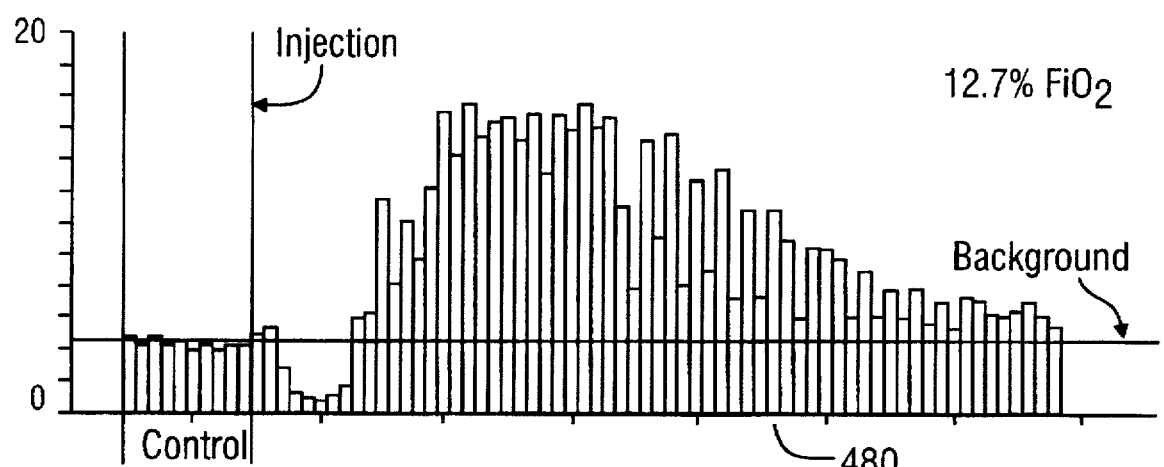
FIG 20A, FIG. 20B and FIG. 20C is a diagrammatic representation showing a time-mean pixel brightness curve for each injection of contrast agent used in the method of automated video densitometry implemented by the present invention.
Figure 20B:
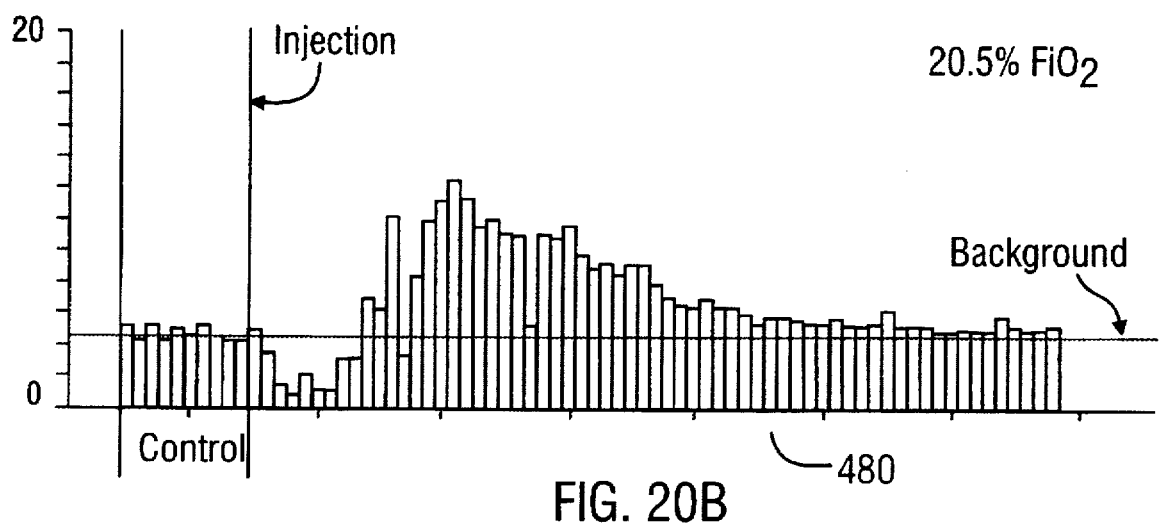
Figure 20C:
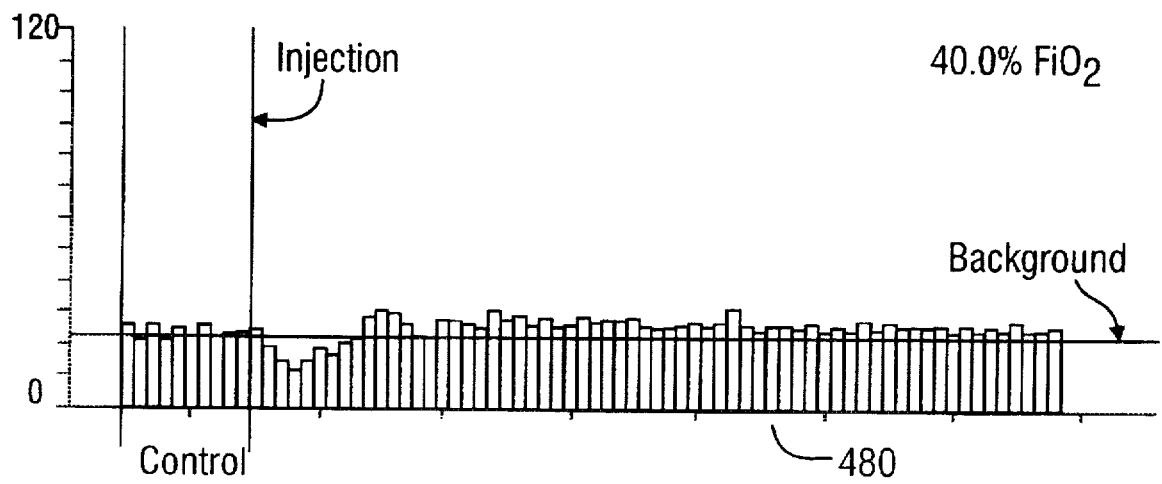

The mean pixel brightness for the ED frames following injection of the contrast agent is then compared to this background. This results in a time-mean pixel brightness curve for each injection, as shown in FIG. 20.

Subsequently, the maximum right ventricular mean pixel brightness is recorded and the area under the right ventricular time-brightness curve above background is calculated for each injection. For the left ventricle, the minimum mean brightness, maximum mean brightness, area under the left ventricular time-brightness curve above background, and the number of ED frames during which the mean cavity brightness is above background are calculated.

Because both the epicardial and endocardial contours of the parasternal short axis view are approximated, the mean pixel brightness of the pixel between the two borders can also be calculated. This represents the mean pixel brightness of the myocardium of the left ventricle. By segmenting the regions of myocardium into regions approximating the distributions of the coronary arteries, the method can be used to estimate whether perfusion is present in a region, by comparing a pre-contrast mean pixel brightness to that calculated after peripheral injection of one of the transpulmonary ultrasound contrast agents.

The automated method for video densitometry described above may find widespread application when improvements of myocardial contrast agents are developed. Specific regions might be set up with prior models in order to identify perfused myocardial regions or to detect the occurrence of myocardial reperfusion following thrombolytic therapy in acute myocardial infarction. With stable contrast agents, the brightness curve over the left ventricle may permit the calculation of cardiac output by a means similar to the dye dilution method. Application of the above described method in long axis views with regions placed over the left atrium and left ventricle, for example, may facilitate evaluation of the severity of valvular insufficiency, such as mitral regurgitation, and possibly calculation of regurgitant volume.

Summary Comments

The invention has great practical potential in both the clinical and operating room setting. An anesthesiologist caring for an increasingly older patient load and with increasingly more cardiovascular disease would benefit from an automated, non-invasive echocardiographic system which would monitor their patients for early signs of ischemia. Such a device would alert the physician of the need for alterations in anesthetic depth and technique. Recent literature indicates that with current technology, anesthesiologists cannot easily detect the early signs of ischemia.

With the availability of a system which provides a more rapid and more accurate analysis of two-dimensional short-axis cardiac images, cardiologists would have an increased ability to study patients over a longer period of time and in more diverse situations. As pre-operative ischemia and post-operative ischemia becomes more recognized as a significant indicator of risk, such a system would allow automated monitoring of patients both before and after surgery.

A number of embodiments of the present invention have been described. Nevertheless, it will be understood that various modifications may be made without departing from the spirit and scope of the invention. For example, while the invention has been described principally in terms of rectangular coordinates, all of the methods described may be applied to echocardiographic image data in polar coordinates.

As another example, as mentioned above, the center-point and endocardial and epicardial wall search regions determined using the circular and elliptical arc filters described above might be used as region-of-search indicators for other already developed edge-detection algorithms, such as the one described by L. Zhang and E. A. Geiser, *An Effective Algorithm for Extracting Serial Endocardial Borders From 2-D Echocardiograms, IEEE*, Transactions Biomed. Eng., Vol. BMIE-3 1, pp. 441–447, 1984. Thus, edge-detection algorithms that previously required extensive operator input could now be made more convenient to use because of the automated center-point and region-of-interest determination method described above.

As yet another example, because the invention provides a means for detecting elliptical objects in a fully automated fashion from ultrasound images, another application would be in the aging of fetal development. This is currently done by manual measurement of diameters, circumference, and area of the fetal head by obstetrical ultrasound studies. The present invention could accomplish these measurements in a fully automated fashion in real-time or near real-time.

As still another example, the methods of the present invention provide a means for detecting elliptical objects in a fully automated fashion from digital images generated by means other than ultrasound, such as photographic, X-rays (planar and tomographic), and magnetic resonance imaging.

Accordingly, it is to be understood that the invention is not to be limited by the specific illustrated embodiment, but only by the scope of the appended claims.

REFERENCES

The references listed below are incorporated herein by reference to the extent they supplement, explain, provide a background for or teach methodology, techniques and/or compositions employed herein.

Fraser, et al., U.S. Pat. No. 5,257,624.
Geiser, et al., U.S. Pat. No. 5,360,006.
Kerber, Richard E., Ed., *Applications of Automatic Edge Detection and Image Enhancement Techniques to Two-Dimensional Echocardiography and Coronary Disease*, Echocardiography in Coronary Artery Disease, E. A. Geiser (Futura Publishing Company, Mount Kisco, N.Y. 1988 ISBN 087993-325-9).
Zhang, L. and Geiser, E. A. *An Effective Algorithm for Extracting Serial Endocardial Borders From 2-D Echocardiograms, IEEE, Transactions Biomed. Eng.*, Vol. BMIE-3 1, pp. 441–447, 1984.

What is claimed is:

1. A method for quantitatively analyzing a diagnostic image of a left ventricle including the steps of:
   a. generating a diagnostic image frame in a digital format containing rows and columns of pixels of a left ventricle having a posterior epicardial border, and an anterior epicardium;
   b. determining a first tentative center-point for the left ventricle and the position of the posterior epicardial border of the left ventricle depicted in the diagnostic image by frame repeatedly filtering the image frame with a set of circular arc filters until a maximum value for the set of filters is obtained;

c. determining a second tentative center-point for the left ventricle and the position of the anterior epicardium of the left ventricle depicted in the diagnostic image frame by repeatedly filtering the image frame with a set of matched elliptical arc filters until a maximum value for the set of matched filters is obtained;

d. determining a final center-point for the left ventricle depicted in the diagnostic image frame as midway between the anterior epicardial border and the posterior epicardial border along a line through the first and second tentative center-points; and e. indicating the position of the final center-point in connection with the diagnostic image frame of the left ventricle.

2. The method of claim 1, wherein the step of determining the position of the posterior epicardial border of the left ventricle further includes filtering the image frame in a lower half region of a sector scan at pixel locations having intensities which exceed the maximum intensity value of the image by more than 60%.

3. The method of claim 1, wherein the step of determining the position of the posterior epicardial border of the left ventricle further includes filtering the image frame in multiple passes, wherein a first pass produces a best column corresponding to the column which yields the most consistent maximum filter output values across the frame.

4. The method of claim 3, wherein a second pass searches in a small band of rows which are proximate the best column, wherein the second pass produces a best row corresponding to the row which yields the most consistent maximum filter output values across the image frames.

5. The method of claim 4, wherein a third pass searches in a small region of columns and rows which are approximately the best column and best row, and thereby determines the position of the posterior epicardial border of the left ventricle depicted in the image frame.

6. The method of claim 5, wherein the step of determining the position of the anterior epicardium of the left ventricle depicted in the image frame comprises the steps of:

a. approximating first tentative positions of the right and left epicardium by repeatedly filtering the image frame with a set of elliptical arc matched filters until a maximum value for the set of filters is obtained;

b. establishing a search region for the anterior epicardium by:
  (1) calculating a cumulative intensity level distribution in the anterior direction by summing across a plurality of elliptical arcs determined by the distance from the second tentative center-point and the first tentative positions of the right and left epicardium,
  (2) establishing a threshold for the intensity level distribution,
  (3) determining the rows in which the anterior epicardium may exist by determining the first and last rows which contain intensity values which consistently exceed the threshold across the image frames;

c. searching the search region by:
  (1) performing a second derivative operation upon the pixels that lie within the search region and generating a plurality of anterior epicardium pixel locations which exceed a predetermined threshold; and
  (2) determining the anterior epicardium pixel locations which have the smallest variation in position across the image frame.

7. The method of claim 6 wherein said region is limited to a range of approximately 25% of the major epicardial diameter of the ventricle.

8. The method of claim 5 further comprising the steps of:

a. computing several equiangular regions wherein said regions are grouped into grouped regions and contain cumulative gray level distribution of pixels at selected radial distances from the center-point;

b. computing said first, second, and final center points again along the elliptical arcs parallel to the estimated epicardial order;

c. summing the amplitude distributions along the elliptical arcs parallel to the epicardial border; and d. calculating the figures of merit of the elliptical arc filters to better define the epicardial position estimates.

9. The method of claim 8 wherein said equiangular regions comprise 64 such regions.

10. The method of claim 9 wherein said equiangular regions are grouped into 8 regions.

11. The method of claim 8 further comprising the step of averaging said level distributions at each said radial length.

12. The method of claim 11 further comprising the step of repeating the averaging step along the elliptical arcs parallel to the estimate epicardial border.

13. The method of claim 8 further comprising the step of calculating a figure of merit by defining a small region within the chamber cavity using the estimated position of the epicardium.

14. The method of claim 13 wherein said small region is further defined by a lower limit equal to the row of the center-point, an upper limit equal to ½ of the anterior radius, and a width equal to the columns at ±¼ the radius to the left and right of the column center-point.

15. The method of claim 13 wherein the average intensity value or "chamber" gray level of said small region is calculated and compared to the intensity values of the elliptical arcs defining the epicardium and wherein if the epicardium intensity data is less than or equal to the chamber gray level within its region, then the epicardial data is considered to be poor, and wherein if the gray level of the epicardium within a region is greater than the chamber mean but less than the mean gray level for the region plus ½ of its standard deviation, the epicardial data is questionable, and wherein if the epicardial gray level for the region is greater than the mean of its region plus of its standard deviation, then the estimated position is likely good.

16. The method of claim 5 further comprising the steps of:

a. computing several equiangular regions wherein the regions contain cumulative gray level distribution of pixels at selected radial distances from the center-point and said equiangular regions are used to adjust the epicardial border;

b. averaging the cumulative distributions at each radial length for each region;

c. computing the averages again along the elliptical arcs parallel to the estimated epicardial order;

d. summing the distributions along the elliptical arcs parallel to the epicardial border; and e. computing the overall average intensity level along the arc corresponding to the epicardial curve for each region.

17. The method of claim 1 further comprising the steps of:

a. repeating said search to further define the anterior epicardial pixel locations which have the smallest variation in position across the image frame; and b. searching the further defined epicardial border regions using elliptical filters which are dynamically determined by the distance to the anterior and posterior walls, the semi-major axes, and by the distance from said second tentative center-point to the right and left border regions.

18. A method for quantitatively analyzing a diagnostic digital image of the left ventricle, including the steps of:
   a. determining a first tentative center-point for and a region of search for the posterior epicardial border of the left ventricle depicted in the diagnostic image by repeatedly filtering the diagnostic image with a set of circular arc filters until a maximum value for the set of filters is obtained;
   b. determining a second tentative center-point for and a region of search for the anterior endocardial and epicardial borders of the left ventricle depicted in the diagnostic image by repeatedly filtering the diagnostic image with a set of coupled elliptical arc filters until a maximum value for the set of coupled filters is obtained;
   c. determining a final center-point for the left ventricle depicted in the diagnostic image as midway between the anterior epicardial border and the posterior epicardial border along a line through the first and second tentative center-points; and
   d. indicating the position of the final center-point in connection with the diagnostic image.

19. A method for quantitatively analyzing a diagnostic digital image of the heart, said images containing rows and columns of pixels, said method including the steps of:
   a. identifying a maximum pixel value in a portion of said image where an interface of myocardium and lung is expected;
   b. selecting two threshold values t1 and t2 which are fractions of said maximum pixel value;
   c. creating a first image having pixel values by steps comprising:
      i. assigning a value of zero to locations in the image where the pixel values are less than t1;
      ii. assigning a value of 1 to locations in the image where the pixel values are between t1 and t2; and
      iii. assigning a value of 2 to locations in the image where the pixel values are greater than t2;
   d. determining an expected vertical diameter of said myocardium;
   e. summing the gray level values of pixel locations along a 180 circular arc having a radius r which varies from ¼ and ¾ of said expected diameter;
   f. calculating a totalsum=sum(r)+2sum(r+step)−sum(r−step)−sum(r−2step)−(r−3step)−sum2(r−step), where sum(r) is the sum of the pixel values along the circular arc, sum2(r) is the sum of the pixel values along a 90 subarc symmetric with respect to the vertical centerline of the left ventricle;
   g. calculating t=totalsum*min(r, expectedradius); and
   h. comparing the t values for each row and selecting the row with the highest t value as the anterior epicardial border.

20. The method of claim 19, which further comprises the step of determining the position of the posterior epicardial border of the left ventricle by filtering the image frame in a lower region of the image at pixel locations having intensities which exceed the maximum intensity value of the image by more than 60%.

21. The method of claim 19, which further comprises the step of determining the position of the posterior epicardial border of the left ventricle by filtering each image frame in multiple passes, wherein a first pass produces a best column corresponding to the column which yields the most consistent maximum filter output values across the image frame.

22. The method of claim 21, wherein a second pass searches in a small band of rows which are proximate the best column, and wherein the second pass produces a best row corresponding to the row which yields the most consistent maximum filter output values across all image frames.

23. The method of claim 22, wherein a third pass searches in a small region of columns and rows which are approximately the best column and best row, and wherein the third pass determines the position of the posterior epicardial border of the left ventricle depicted in the image frame.

24. The method of claim 19 wherein said threshold values $t_1$ and $t_2$ are equal to ½ and ¾, respectively.

25. The method claim 1 further comprising the steps of:
   a. searching the left and right epicardial border regions a second time using elliptical filters which are dynamically determined by the radius to the anterior and posterior walls, the semi-major axes, and by the distance from the center-point to the right and left border regions; and
   b. calculating the radial separation between non-zero weights of the filter as proportions of the vertical diameter of the left ventricle to optimize the separations, produce the best gradient information, and ensure that the search will not produce a gradient which reaches across from inside the endocardium to outside of the epicardium.

26. A method of calculating a figure of merit for a left ventricle comprising the steps of:
   a. defining a small region within a chamber cavity which estimates the position of the epicardium, said region defined having a lower limit equal to the row of the center-point of the left ventricle, an upper limit equal to ½ of the anterior radius, and having a width equal to the columns at ±¼ the radius to the left and to the right of the column of the center-point;
   b. calculating the average intensity value of the region; and
   c. comparing said average to the intensity values of the elliptical arcs defining the epicardium wherein if the epicardium intensity data is less than or equal to the chamber gray level within its octant, then the epicardial data is considered to be poor, and wherein if the gray level of the epicardium within an octant is greater than the chamber mean but less than the mean gray level for the octant plus ½ of its standard deviation, then epicardial data is questionable, and wherein if the epicardial gray level for the octant is greater than the mean of its octant plus of its standard deviation, then the estimated position is likely good.

27. The method of claim 26 wherein said equiangular regions comprises 64 such regions.

28. The method of claim 26 further comprising the step of enhancing the image using the estimated region of interest and figures of merit.

29. The method of claim 26 further comprising the step of facilitating the automatic regional amplification using the figures of merit.

30. A method of determining a wall motion using a set of time varying echocardiographic image frame comprising the steps of:

a. determining the center-point of the left ventricle;

b. forming eight one-dimensional amplitude distributions for each of eight 45° sectors emanating from the center-point; and c. obtaining the cross-correlation for each said amplitude distributions between the frame at end-diastole and the frame at end-systole to detect the wall motion in each of the different regions wherein the amount of radial shift producing the maximum cross-correlation gives an estimate of the amount of wall motion in each sector between the two time frames studied.

31. A method of detecting dropout across the interventricular septum between the left and right ventricles comprising the steps of:

a. comparing the minimum average grey level of a small image region in the cavity of a left ventricle around the center-point with the maximum average grey level of a set of similarly sized regions chosen along a line from the center-point of the ventricle in the direction of the septum; and b. wherein if the maximum ratio of the peak level to the background level for the series of comparisons is less than two, signal dropout is considered to have been detected.

32. Method of automated video densitometry comprising the steps of:

a. obtaining control frames from a baseline period;

b. identifying the sides and last row of a sector scan;

c. detecting the approximate position of the endocardial and epicardial borders by using the endocardial borders derived during the control period as the region of interest for the left ventricular chamber;

d. injecting a contrast agent;

e. obtaining post-contrast frames;

f. estimating the position of the posterior epicardium on each frame by computing a posterior circular arc filter;

g. translating the regions of interest based upon the difference in position of the posterior circular arc filter and the position of the posterior circular arc filter in the first control frame;

h. calculating the mean pixel intensity of the left ventricular chamber for the pixels enclosed by the approximated endocardial border, and similarly calculating the mean pixel intensity of the right ventricular outflow tract;

i. comparing the mean pixel intensity for the sequence of end diastolic frames with the background pixel intensity means from the time-mean brightness curve for each injection;

j. segmenting the regions of the myocardium into regions approximating distributions of coronary arteries; and k. estimating whether perfusion is present in a region by comparing a pre-contrast mean pixel brightness to that calculated after injection of the contrast agents.

33. A method for quantitatively analyzing a diagnostic image of a left ventricle including the steps of:

a. generating a diagnostic image frame of a left ventricle having a posterior epicardial border and an anterior epicardial border;

b. determining a first tentative center-point $(x_0, y_0)$ for said left ventricle and the position of said posterior epicardial border by repeatedly filtering the image frame with a set of circular arc filters until a maximum value for the set of filters is obtained;

c. determining a second tentative center-point $(x_1, y_1)$ for said left ventricle and the position of said anterior epicardium by repeatedly filtering the image frame with a set of matched elliptical arc filters until a maximum value for the set of matched filters is obtained; and d. determining a final center-point for said left ventricle by using said first and second tentative center-points and weighting functions.

34. The method of claim 33 wherein the step of determining a final center is further comprised of the steps:

a. selecting a narrow band about said $y_0$ value;

b. forming a one-dimensional distribution D(y) by summing the pixel values in bands along circular arcs centered at $(x_0, y_0)$;

c. assigning a value to an epicardial weight function epiW(y) at the location y, wherein said epiW(y) is 1 if D(y)>⅔ of the maximum for the entire distribution, otherwise said epiW(y) is 0; and d. assigning a value to an endocardial weight function endoW(y) at the location y, wherein said endoW(y) is 1 if D(y)>½ of the maximum for the entire distribution, otherwise said endoW(y) is 0.

35. The method of claim 34 further comprising the step of testing for a cavity by:

a. forming a second one-dimensional distribution E(y) defined by the average (D(y−10)+D(y−9) . . . +D(y+9)+D(y+10))/21;

b. determining maximum $E_{max}$ and minimum $E_{min}$ values of E(y);

c. increasing said endoW(y) to 2, if endoW(y)=1 and E(y−10)<(2*$E_{min}$+$E_{max}$)/3; and d. increasing said epiW(y) to 2, if epiW(y)=1 and E(y−10)<(2*$E_{min}$+$E_{max}$)3.

36. The method of claim 35 further comprising the steps of:

a. locating a pixel Q(x,y) near a column containing said point $(x_0,y_0)$;

b. calculating a filter value at (x,y) defined by V(x,y,k,k+c)=[$(s_k-s_{k+c})$*epiW($y_1$) *$(s_{k+c}-s_k)$*endoW($y_2$)](k−(k+c)), wherein $s_k$ represents the sum of pixel values on a selected set of points distributed along an elliptical arc of radius at a distance k from the center, $y_1<y_2$, $y_1=y-k$, $y_2=y-(k+c)$, and c is an incremental constant;

c. locating the second tentative center-point for the left ventricle $(x_1, y_1)$ as the maximum resulting pixel location; and d. determining the center-point of the left ventricle $(x_0, y_2)$, wherein $y_2=(y_0+r_0+y_1-r_1)/2$, $r_0$ is the distance from the first tentative center to the epicardial border, and $r_1$ is the distance from the second tentative center to the epicardial border.

37. A method for determining the optical density of a digital image of a left ventricle said method comprising the steps of:

a. obtaining a control frame from a baseline period prior to injecting any contrast agent;

b. eliminate any patient data or irrelevant information from said image;

c. approximating the position of the endocardial and epicardial borders on said control frame;

d. establishing a region of interest for said right ventricular outflow tract;

e. injecting contrast agent and obtaining an ED frame;

f. calculating the mean pixel intensity of the left ventricular chamber for the pixels enclosed by the approximate endocardial contour, and likewise calculating the mean pixel intensity of the right ventricular chamber to obtain right and left ventricular time-brightness curves;

g. determining the maximum right ventricular mean pixel brightness and the area under the right ventricular time-brightness curve above background;

h. determining the minimum left ventricular mean pixel brightness and the area under the left ventricular time-brightness curve above background;

i. obtaining a time-mean pixel brightness curve by comparing the mean pixel brightness for said ED frame following injection of the contrast agent to the background frame;

j. approximating the epicardial and endocardial contours of the peristomal short axis view; and k. calculating the mean pixel brightness of the myocardium of the left ventricle as the mean pixel brightness of the pixel between the epicardial and endocardial borders.

38. The method of claim 37 further comprising the step of determining whether perfusion is present in a region by comparing a pre-contrast mean pixel brightness to that calculated after peripheral injection.

* * * * *

UNITED STATES PATENT AND TRADEMARK OFFICE
CERTIFICATE OF CORRECTION

PATENT NO. : 5,,797,396

DATED : August 25, 1998

INVENTOR(S) : EDWARD A. GEISER and DAVID C. WILSON

It is certified that error appears in the above-identified patent and that said Letters Patent is hereby corrected as shown below:

Col. 31, line 29, insert --image-- after "across the".

Col. 31, line 31, delete "." and substitute --,--.

Col. 31, line 59, delete "frames" and substitute --frame--.

Col. 33, line 52, delete "totalsum" and substitute --total sum--.

Col. 33, line 53, delete "."

Col. 33, line 58, delete "expectedradius" and substitute --expected radius".

Col. 34, line 8, add --to-- between "proximate" and "the".

Col. 34, lines 11-12, delete "all images frames" and substitute --the image frame--.

Col. 34, line 55, delete "of".

UNITED STATES PATENT AND TRADEMARK OFFICE
CERTIFICATE OF CORRECTION

PATENT NO. : 5,,797,396
DATED : August 25, 1998
INVENTOR(S) : EDWARD A. GEISER and DAVID C. WILSON It is certified that error appears in the above-identified patent and that said Letters Patent is hereby corrected as shown below:

Col. 34, line 66, delete "frame" and substitute --frames--.

Col. 35, line 57, delete "agents" and substitute --agent--.

Col. 36, line 28, delete "21" and substitute --2--.

Col. 36, line 59, delete "eliminate" and substitute --eliminating--.

Signed and Sealed this

Second Day of March, 1999

Attest:

Q. TODD DICKINSON

*Attesting Officer*  *Acting Commissioner of Patents and Trademarks*